United States Patent
Lee et al.

(10) Patent No.: US 9,628,604 B2
(45) Date of Patent: Apr. 18, 2017

(54) MOBILE TERMINAL AND CONTROLLING METHOD THEREOF

(71) Applicant: LG ELECTRONICS INC., Seoul (KR)

(72) Inventors: Seojin Lee, Seoul (KR); Samsick Kim, Seoul (KR); Donghwan Yu, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 14/867,869

(22) Filed: Sep. 28, 2015

(65) Prior Publication Data

US 2016/0248899 A1    Aug. 25, 2016

(30) Foreign Application Priority Data

Oct. 8, 2014    (KR) ........................ 10-2014-0135758

(51) Int. Cl.
| | |
|---|---|
| H04M 1/00 | (2006.01) |
| H04M 1/725 | (2006.01) |
| G06F 3/16 | (2006.01) |
| G06F 17/28 | (2006.01) |
| G06F 3/01 | (2006.01) |
| G10L 15/26 | (2006.01) |
| G06F 3/0346 | (2013.01) |
| G06F 3/0484 | (2013.01) |
| G06F 3/0488 | (2013.01) |
| G10L 13/00 | (2006.01) |

(52) U.S. Cl.
CPC ........ *H04M 1/72552* (2013.01); *G06F 3/017* (2013.01); *G06F 3/0346* (2013.01); *G06F 3/0484* (2013.01); *G06F 3/04883* (2013.01); *G06F 3/167* (2013.01); *G06F 17/289* (2013.01); *G10L 15/26* (2013.01); *H04M 1/7253* (2013.01); *G10L 13/00* (2013.01); *H04M 2250/12* (2013.01)

(58) Field of Classification Search
CPC ........... H04M 1/72552; H04M 1/7253; H04M 2250/12; G06F 3/0484; G06F 3/0346; G06F 17/289; G06F 3/017; G06F 3/04883; G10L 15/26
USPC ..................................... 455/569.1
See application file for complete search history.

(56) References Cited

U.S. PATENT DOCUMENTS

| | | | | |
|---|---|---|---|---|
| 8,606,577 B1* | 12/2013 | Stewart | ................... | G06F 3/167 704/231 |
| 2009/0164219 A1 | 6/2009 | Yeung et al. | | |
| 2012/0254810 A1 | 10/2012 | Heck et al. | | |
| 2014/0297257 A1 | 10/2014 | Shin et al. | | |

(Continued)

OTHER PUBLICATIONS

European Search Report dated Mar. 2, 2016 issued in Application No. 15187268.6.

*Primary Examiner* — Amancio Gonzalez
(74) *Attorney, Agent, or Firm* — KED & Associates LLP

(57) ABSTRACT

A mobile terminal and controlling method thereof are disclosed, by which a prescribed function can be performed using a more intuitive gesture and voice input. The present invention includes a display unit, a microphone, a sensing unit configured to detect a gesture, and a controller configured to convert voice data, received based on the microphone, to a text in a first language, detect, using the sensing unit, a first gesture, and in response to detecting the first gesture, translate the text in the first language to text in a second language.

20 Claims, 38 Drawing Sheets

(56) References Cited

U.S. PATENT DOCUMENTS

2015/0051898 A1\* 2/2015 Cuthbert ............... G06F 3/167
704/3

\* cited by examiner

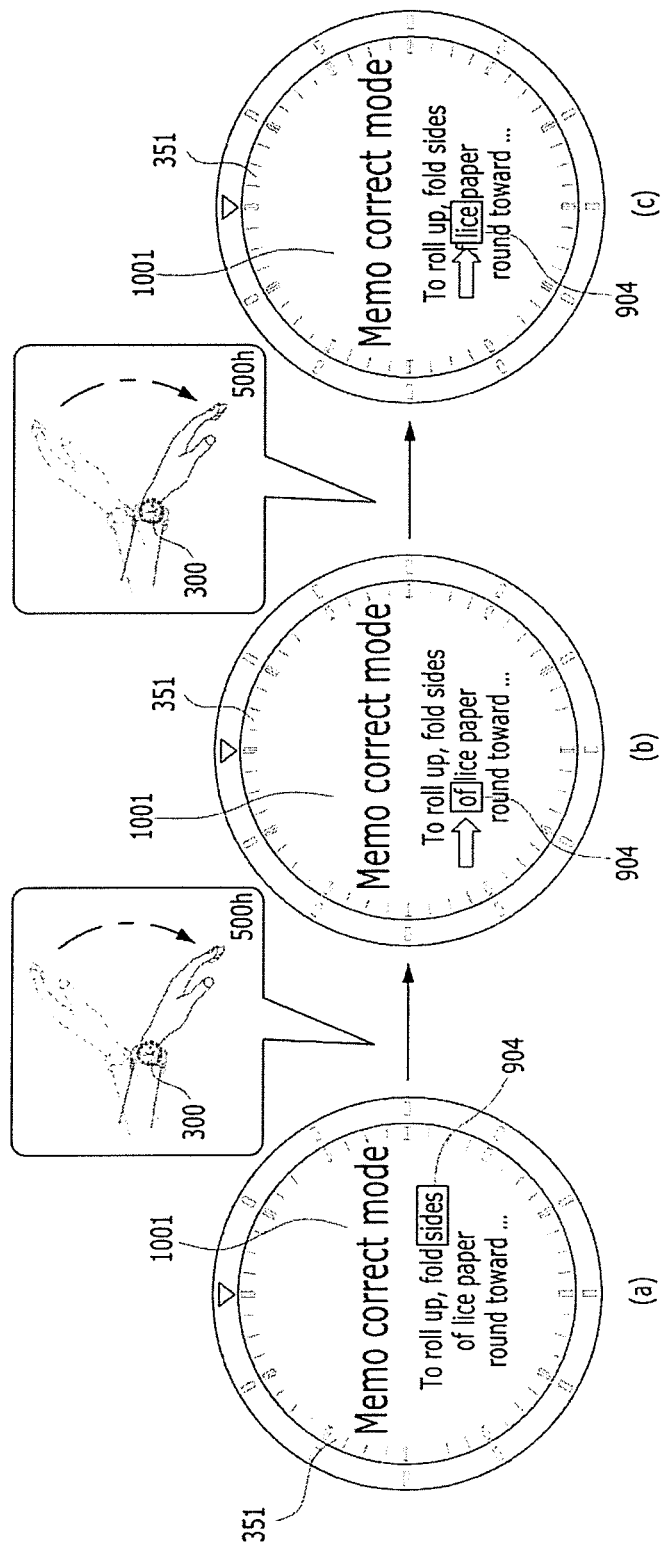

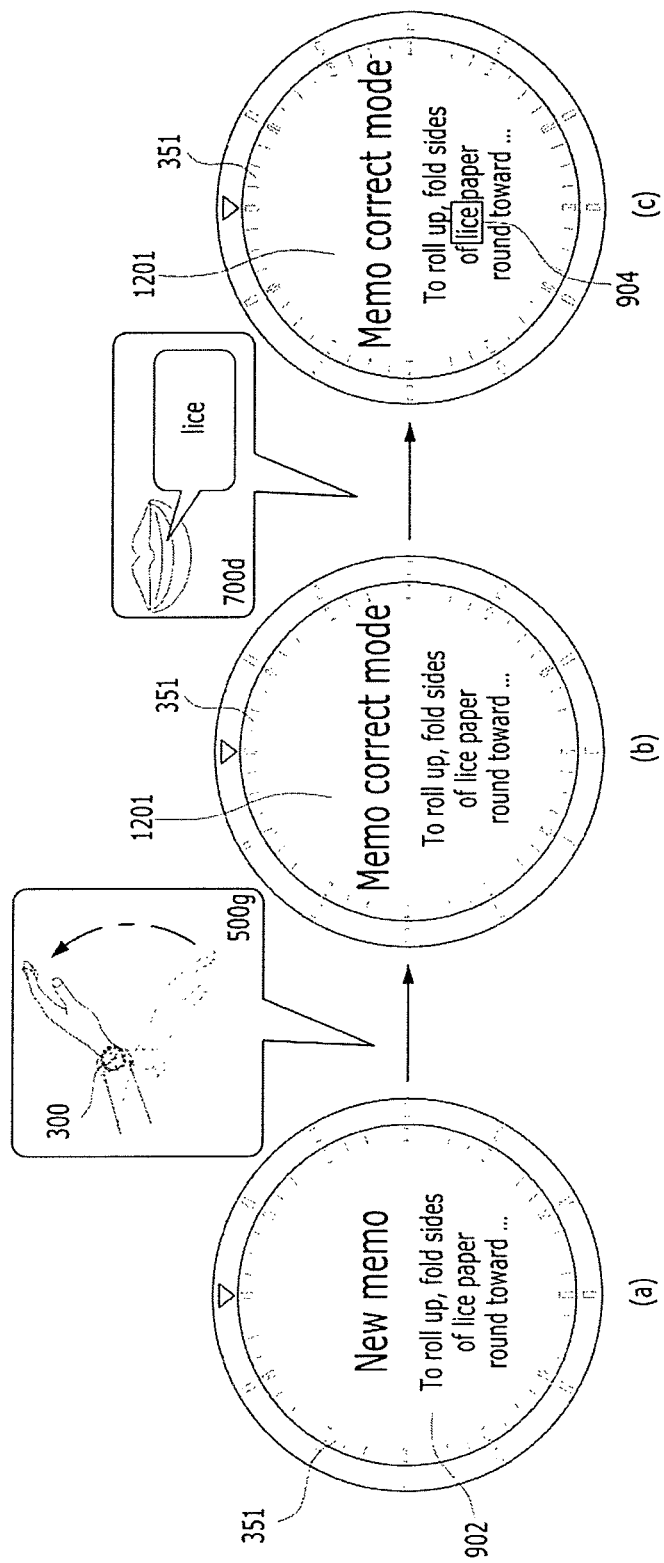

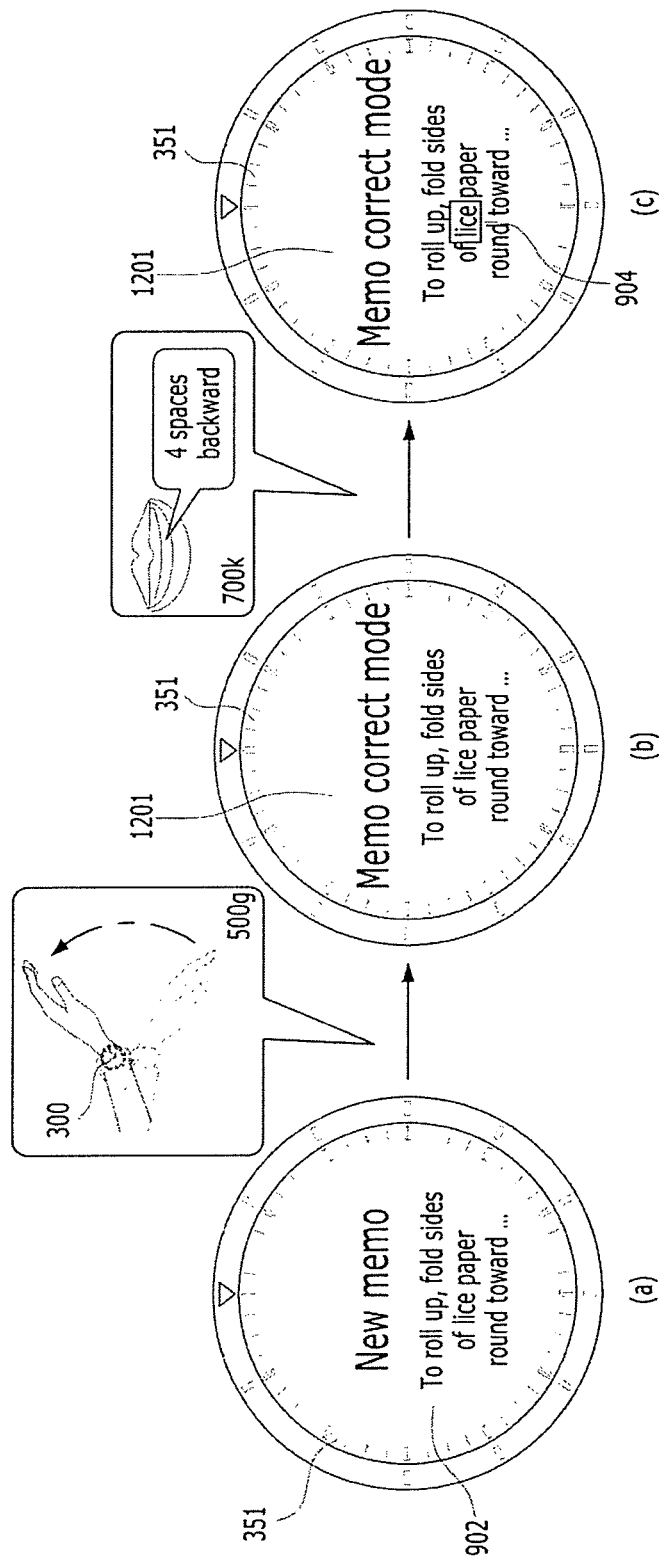

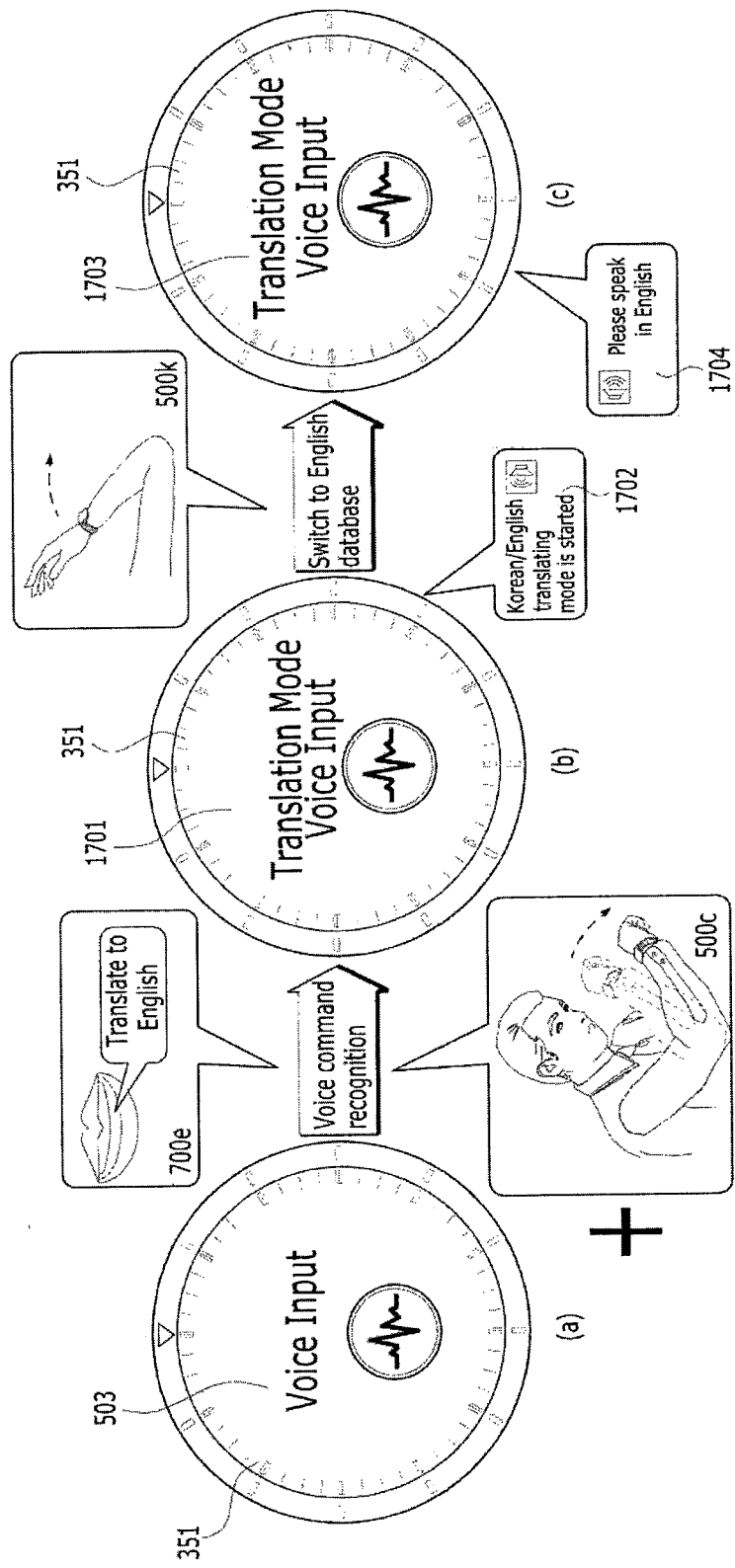

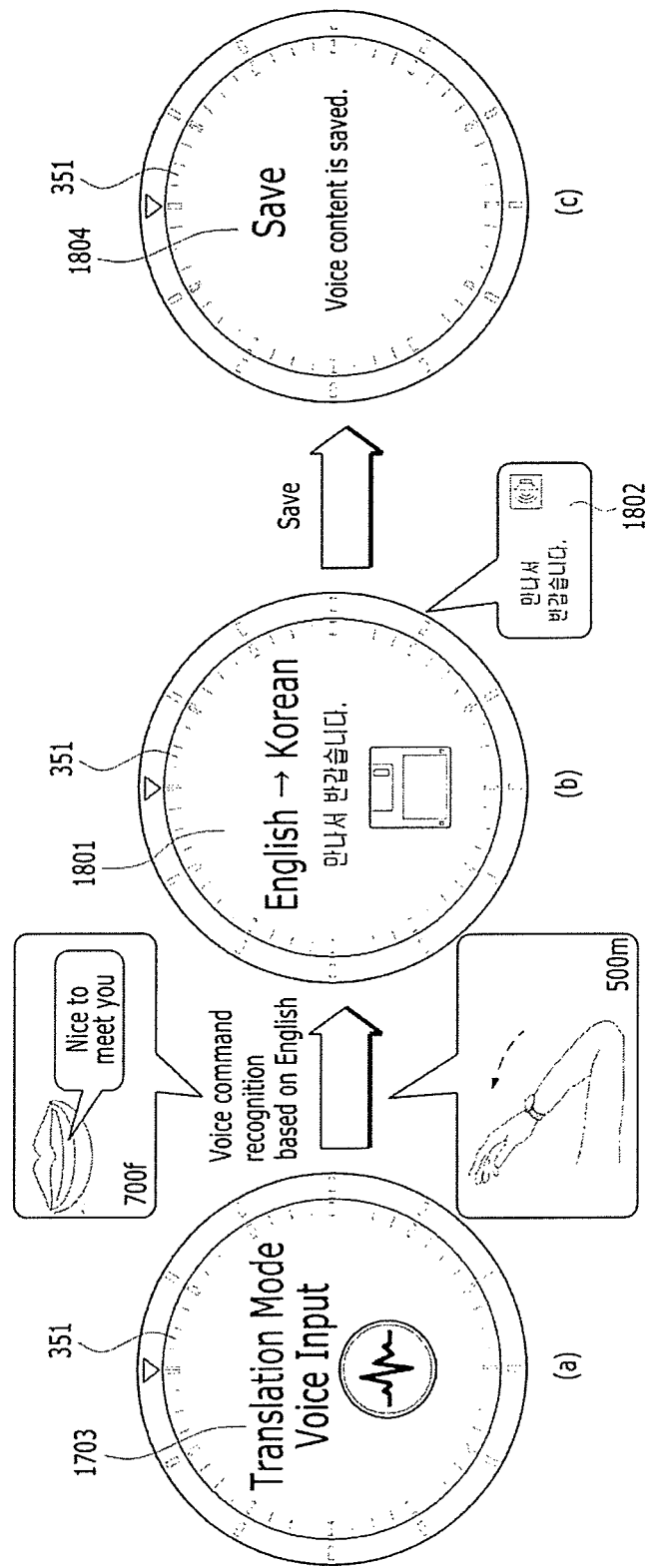

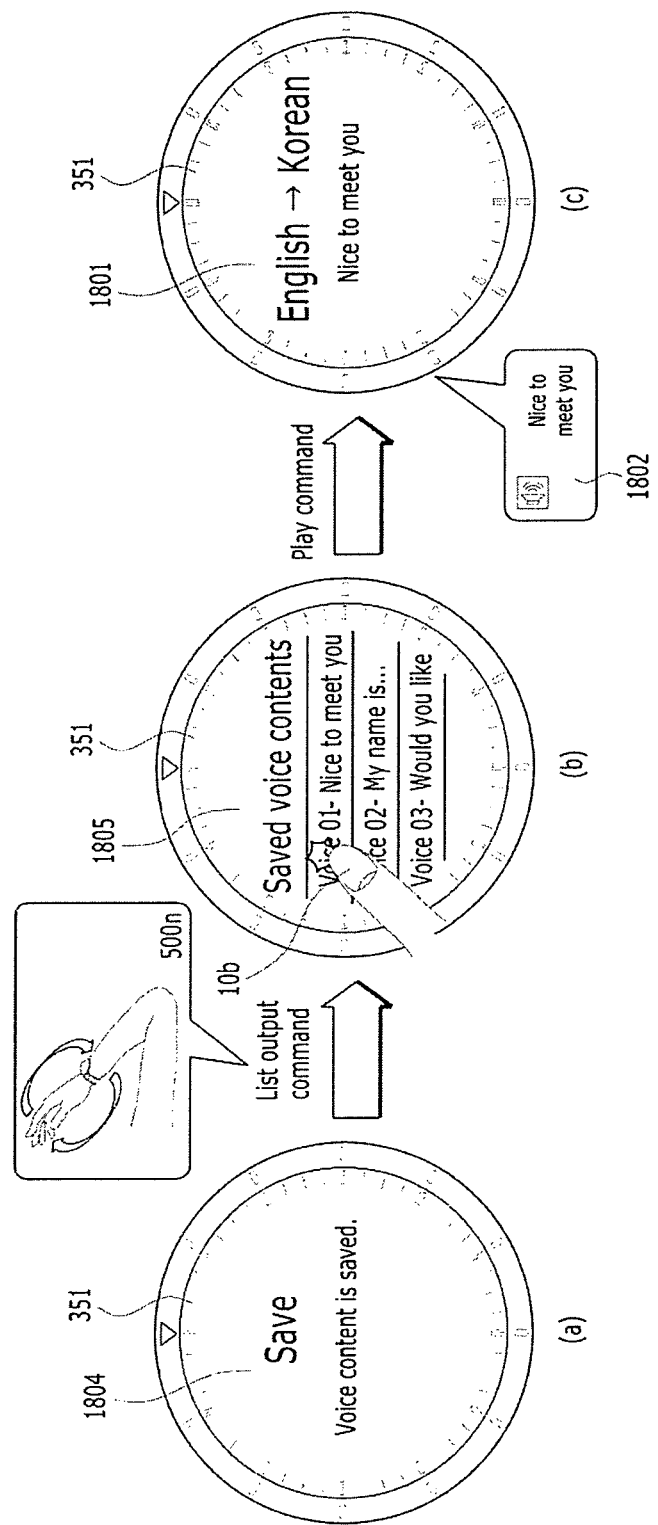

MOBILE TERMINAL AND CONTROLLING METHOD THEREOF

CROSS-REFERENCE TO RELATED APPLICATION(S)

This application claims priority under 35 U.S.C. §119 to Korean Application No. 10-2014-0135758 filed on Oct. 8, 2014, whose entire disclosure is hereby incorporated by reference.

BACKGROUND

1. Field

The present invention relates to a mobile terminal, and more particularly, to a mobile terminal and controlling method thereof. Although the present invention is suitable for a wide scope of applications, it is particularly suitable for facilitating the use of a terminal in further consideration of user's convenience.

2. Background

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive multicast signals which permit viewing of content such as videos and television programs.

As functions of the terminal are getting diversified, the terminal tends to be implemented as a multimedia player provided with complex functions such as photographing of photos or videos, playback of music or video files, game play, broadcast reception and the like for example.

The recent tendency of a mobile terminal market attempts to develop mobile terminals of various types to meet the diversity of the consumer's needs. The types of the developed mobile terminals are focused on the configuration that can emphasize the portability of the mobile terminal. The mobile terminal types for high portability can include such a type wearable on a user's body as a watch type, a glasses type, a necklace type and the like. The mobile terminals of those types exist in case of having difficulty in applying the conventionally used input/output means in the same manner. For instance, since these mobile terminals have a display size relatively smaller than that of a mobile terminal of an existing type, it is necessary to consider a different kind of an output means. Particularly, in case of a mobile terminal of a watch e type, an input means of a totally new type is required due to a limited size of the mobile terminal.

BRIEF DESCRIPTION OF THE DRAWINGS

The embodiments will be described in detail with reference to the following drawings in which like reference numerals refer to like elements wherein:

FIGS. 10A, 10B show diagrams for a control method of selecting a word to correct in correction mode according to one embodiment of the present invention;

FIGS. 12A, 12B show diagrams for a control method of controlling a location of a word selection cursor 904 according to another embodiment of the present invention;

FIG. 17 shows diagrams for configuration of a control method of providing a translation function based on a gesture and a voice input according to one embodiment of the present invention;

FIGS. 18A, 18B show diagrams for a control method of outputting a voice input recognized as a second language by translating it into a first language according to one embodiment of the present invention;

DETAILED DESCRIPTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
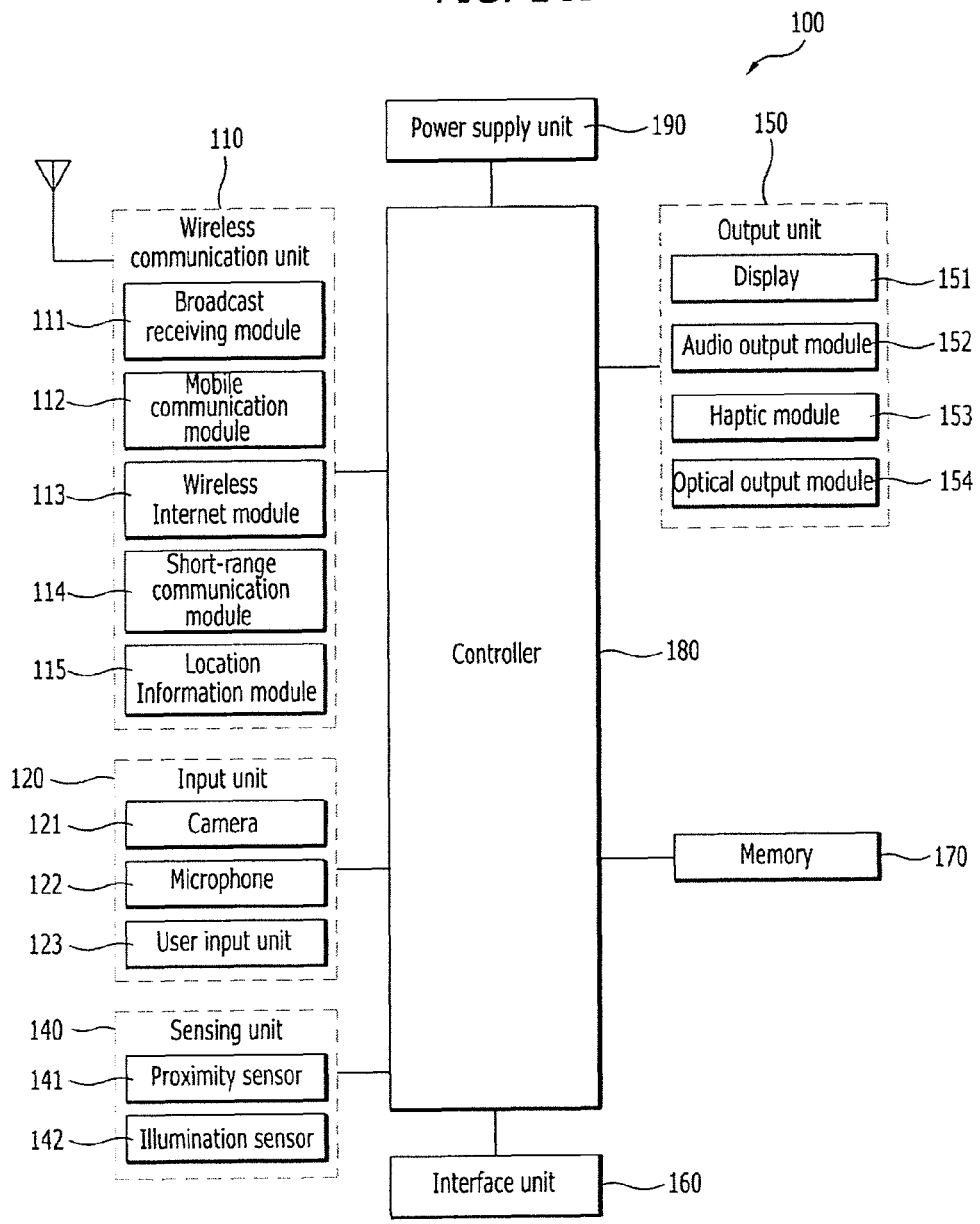
FIG. 1A is a block diagram of a mobile terminal in accordance with the present disclosure.
Figure 1B:
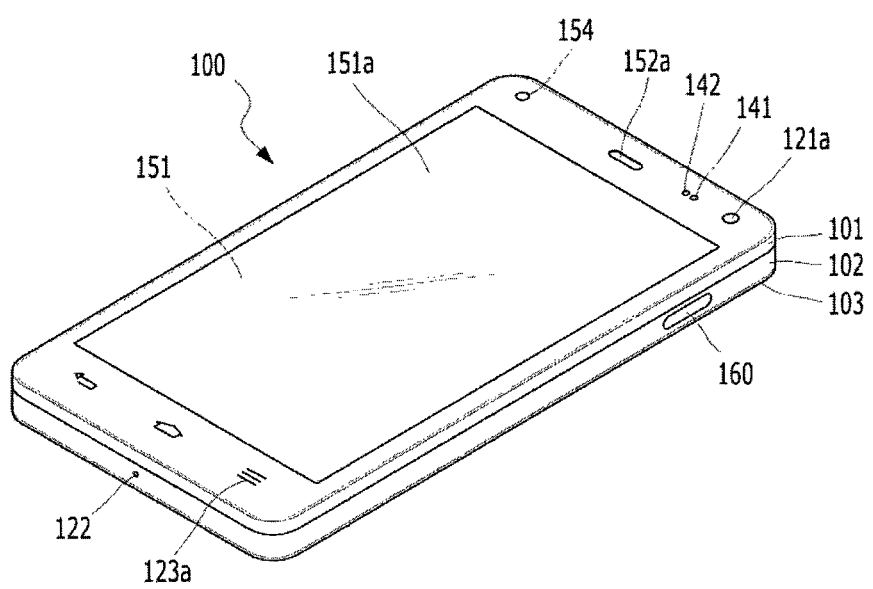
FIGS. 1B and 1C are conceptual views of one example of the mobile terminal, viewed from different directions.
Figure 1C:
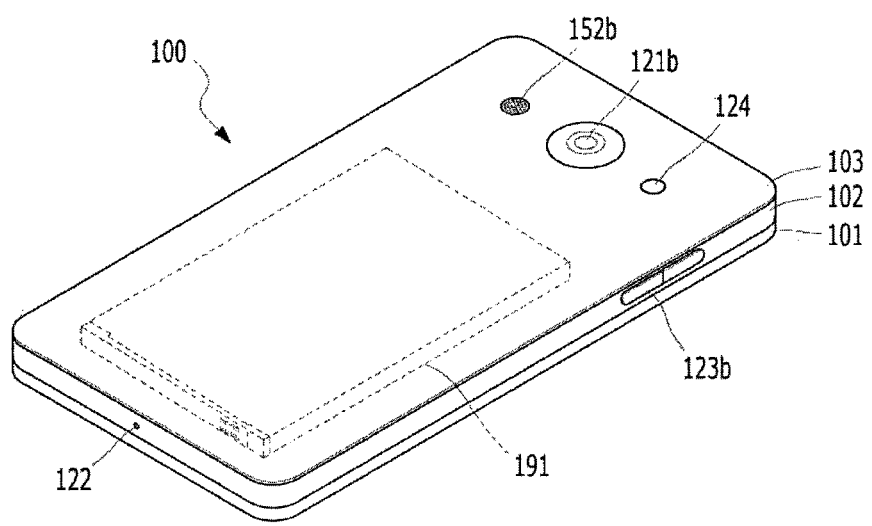

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
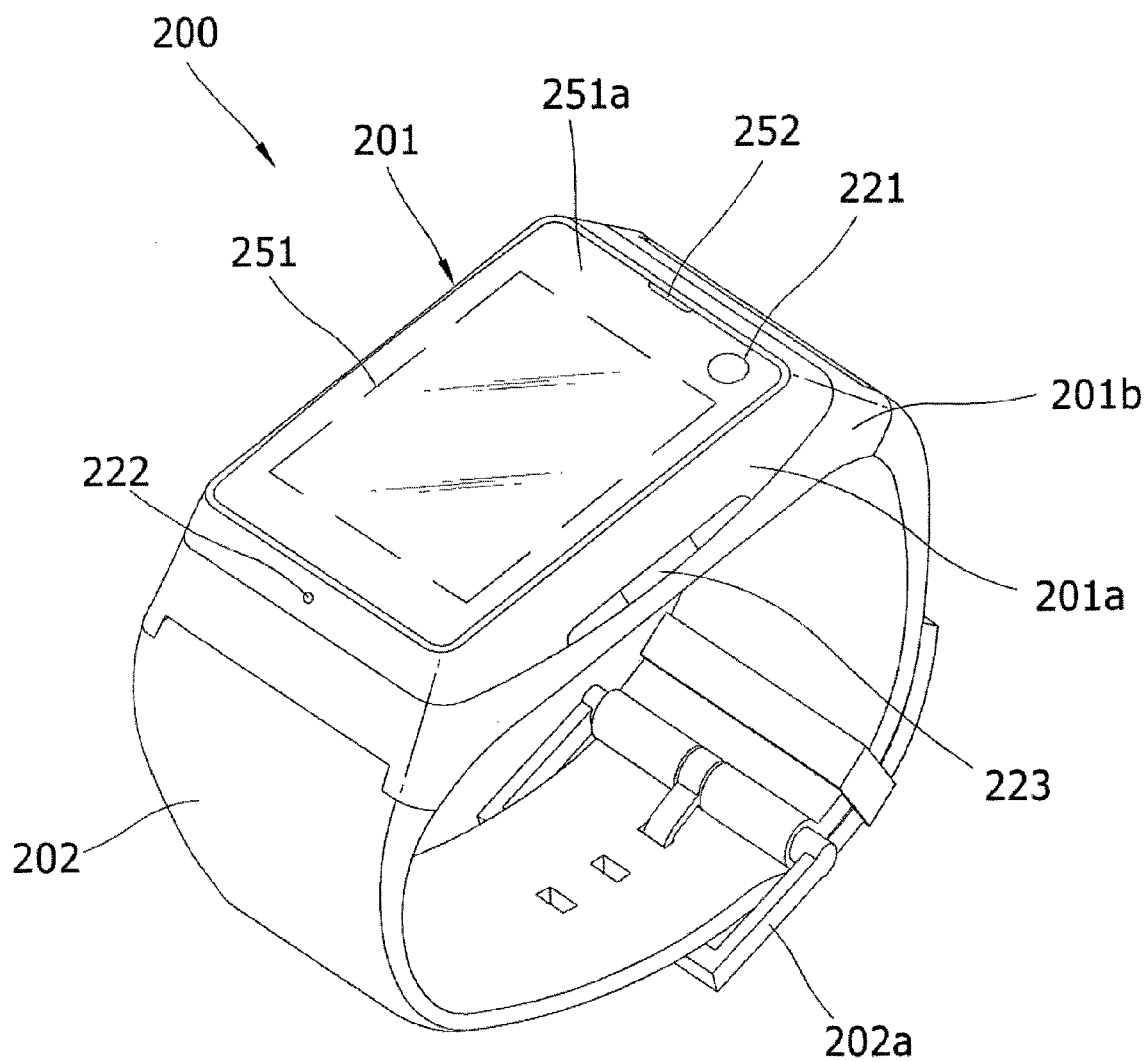
FIG. 2 is a perspective diagram for one example of a mobile terminal of a watch type related to another embodiment of the present invention.

FIG. 2 is a perspective view illustrating one example of a watch-type mobile terminal 200 in accordance with another exemplary embodiment. As illustrated in FIG. 2, the watch-type mobile terminal 200 includes a main body 201 with a display unit 251 and a band 202 connected to the main body 201 to be wearable on a wrist. In general, mobile terminal 200 may be configured to include features that are the same or similar to that of mobile terminal 100 of FIGS. 1A-1C.

The main body 201 may include a case having a certain appearance. As illustrated, the case may include a first case 201a and a second case 201b cooperatively defining an inner space for accommodating various electronic components. Other configurations are possible. For instance, a single case may alternatively be implemented, with such a case being configured to define the inner space, thereby implementing a mobile terminal 200 with a uni-body.

The watch-type mobile terminal 200 can perform wireless communication, and an antenna for the wireless communication can be installed in the main body 201. The antenna may extend its function using the case. For example, a case including a conductive material may be electrically connected to the antenna to extend a ground area or a radiation area.

The display unit 251 is shown located at the front side of the main body 201 so that displayed information is viewable to a user. In some embodiments, the display unit 251 includes a touch sensor so that the display unit can function as a touch screen. As illustrated, window 251a is positioned on the first case 201a to form a front surface of the terminal body together with the first case 201a.

The illustrated embodiment includes audio output module 252, a camera 221, a microphone 222, and a user input unit 223 positioned on the main body 201. When the display unit 251 is implemented as a touch screen, additional function keys may be minimized or eliminated. For example, when the touch screen is implemented, the user input unit 223 may be omitted.

The band 202 is commonly worn on the user's wrist and may be made of a flexible material for facilitating wearing of the device. As one example, the band 202 may be made of fur, rubber, silicon, synthetic resin, or the like. The band 202 may also be configured to be detachable from the main body 201. Accordingly, the band 202 may be replaceable with various types of bands according to a user's preference.

In one configuration, the band 202 may be used for extending the performance of the antenna. For example, the band may include therein a ground extending portion (not shown) electrically connected to the antenna to extend a ground area.

The band 202 may include fastener 202a. The fastener 202a may be implemented into a buckle type, a snap-fit hook structure, a Velcro® type, or the like, and include a flexible section or material. The drawing illustrates an example that the fastener 202a is implemented using a buckle.

In the following description, embodiments relating to a controlling method implemented in the above-configured mobile terminal shall be explained with reference to the accompanying drawings. It will be appreciated by those skilled in the art that the present invention can be specified into other form(s) without departing from the spirit or scope of the inventions.

Figure 3:
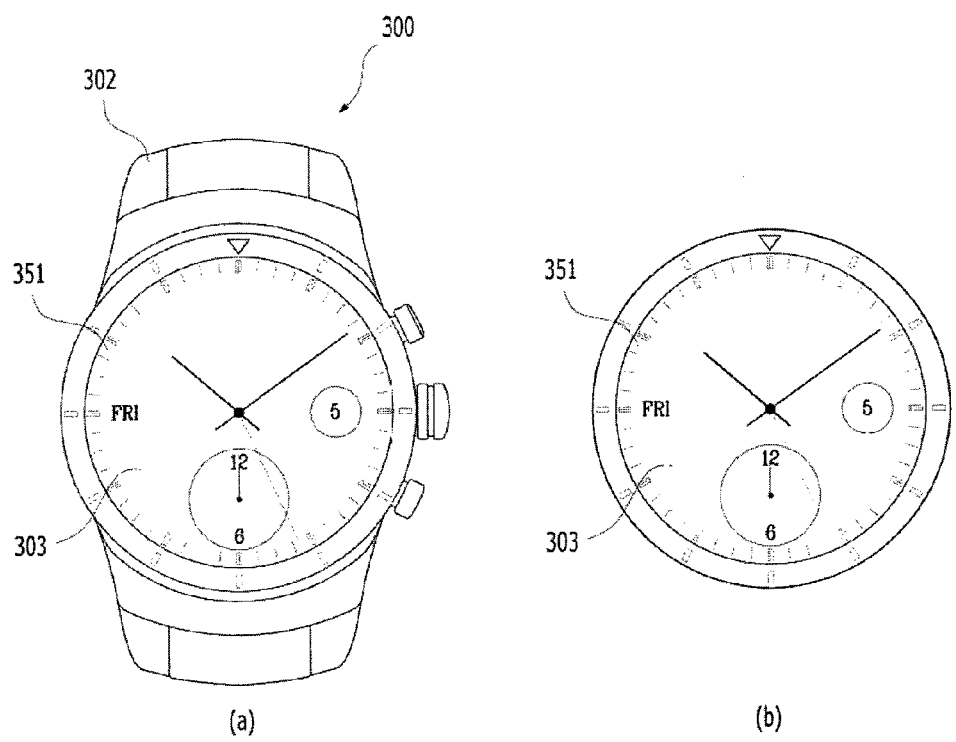
FIG. 3. shows front diagrams for one example of a mobile terminal 300 of a watch according to one embodiment of the present invention.

FIG. 3 is a front diagram for one example of a mobile terminal 300 of a watch according to one embodiment of the present invention.

Referring to FIG. 3 (a), a mobile terminal 300 includes a touchscreen 351 in a circular shape and currently outputs a numeric plate 303 through the touchscreen 351. In the following drawings to describe the present invention, an exterior of the mobile terminal 300 shall be omitted but the touchscreen 351 shall be illustrated like FIG. 3 (b).

As mentioned in the foregoing description, since limitations may be put on the input means of the mobile terminal 300 of the watch type, the ongoing demand for an input means of a new type is rising. To this end, according to one embodiment of the present invention, it is proposed to detect a user's gesture using the sensing unit 140 of the mobile terminal 100. And, it is also proposed to control a primary function of the mobile terminal 300 using the detected user's gesture. In this case, the user's gesture may include a gesture using a hand having the mobile terminal 300 worn thereon.

Particularly, according to one embodiment of the present invention, it is proposed to perform activation/deactivation of voice recognition and other controls by detecting a gesture with a hand having a mobile terminal worn thereon and to run a function corresponding to a recognized voice received from a user.

Such an embodiment shall be described in detail with reference to FIG. 4 as follows.

Figure 4:
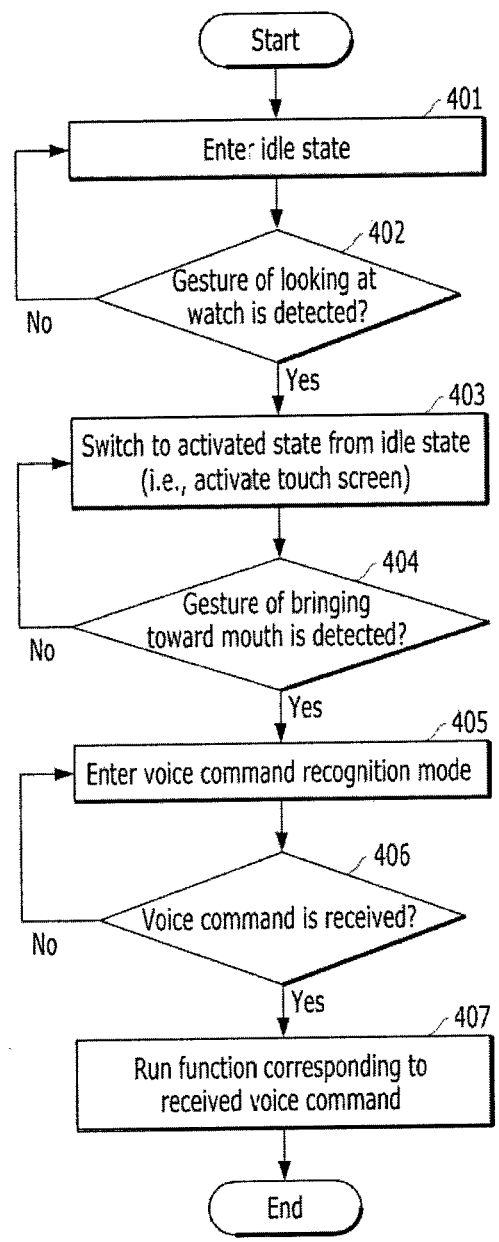
FIG. 4 is a flowchart for a control method of running a voice recognition function through a user's gesture detection according to one embodiment of the present invention.
Figure 5:
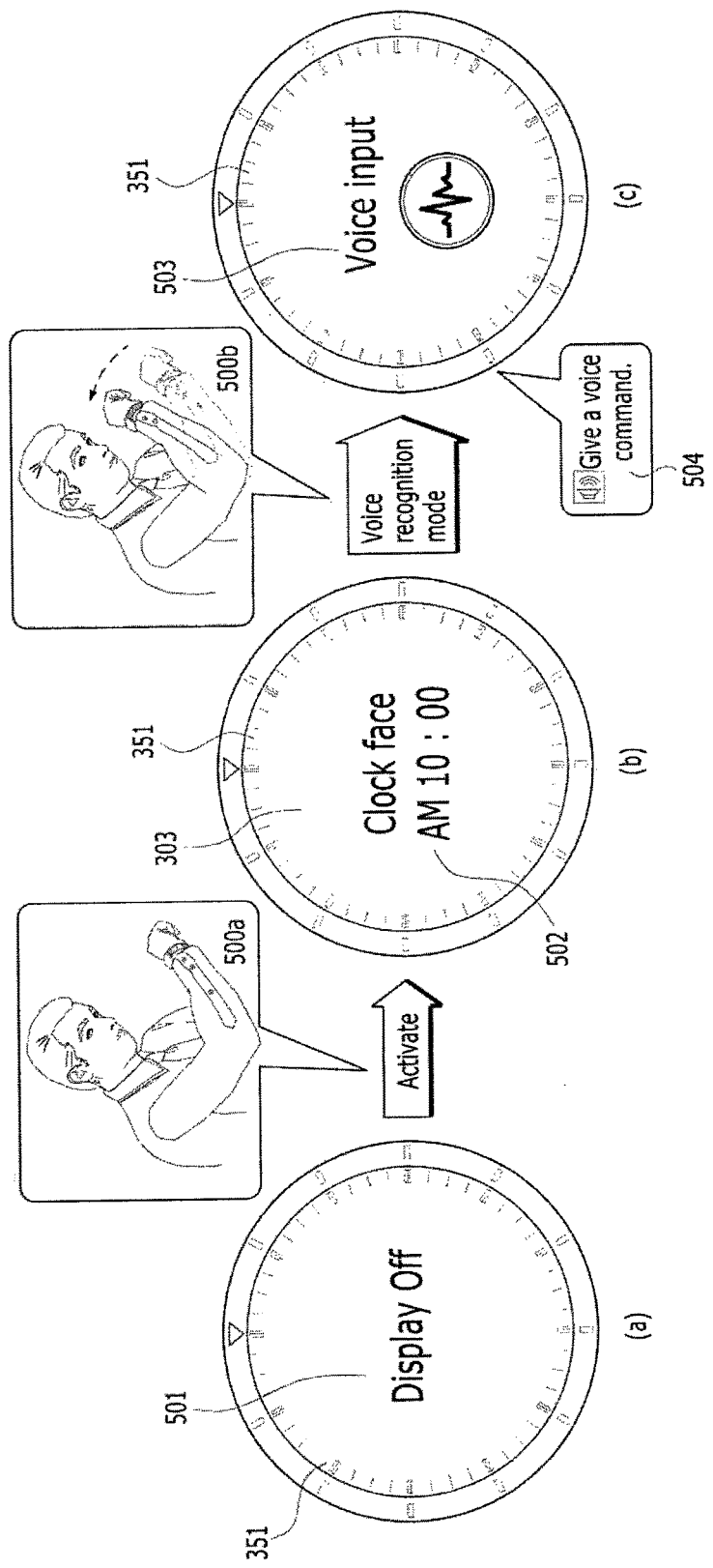
FIG. 5 shows diagrams for configuration of running a voice recognition function according to one embodiment of the present invention.

FIG. 4 is a flowchart for a control method of running a voice recognition function through a user's gesture detection according to one embodiment of the present invention. And, FIG. 5 is a diagram for configuration of running a voice recognition function according to one embodiment of the present invention. The following description shall be made with reference to FIG. 4 and FIG. 5.

Referring to FIG. 4 and FIG. 5, in a step S401, the controller 180 enters an idle state. In this case, the idle state means a state that power consumption of the mobile terminal 300 is set to a minimum. In the idle state, the touchscreen 351 or other unnecessary sensors are deactivated. In case of failing to receive any command from a user for a prescribed time or receiving an idle state enter command from a user, the mobile terminal 300 can switch to the idle state from an activated state. Referring to FIG. 5 (a), a state diagram of the mobile terminal 300 in the idle state is illustrated. And, the touchscreen 351 is deactivated.

In a step S402, the controller 180 determines whether a prescribed gesture (e.g., a gesture as if looking at a watch, hereinafter named a time check gesture 500a) is received from the user. If the prescribed gesture is not received, the controller 180 goes back to the step S401. If the prescribed gesture is received, the controller 180 can go to a step S403.

Since the touchscreen 351 consumes a considerable amount of power in the activated state, if it is determined that the user does not use the touchscreen 351, it may be appropriate to deactivate the touchscreen 351. Yet, when the user intends to check a time using the mobile terminal 300 of the watch type, if the user checks the time after activating the activated touchscreen 351 separately, it may be considerably inconvenient. Therefore, according to one embodiment of the present invention, if the time check gesture 500a is received using a user's hand having the mobile terminal 300 worn thereon, it is able to output the numeric plate 303 for checking a time after activation 502 of the touchscreen 351 like the step S403 [cf. FIG. 5 (b)].

The mobile terminal 300 according to one embodiment of the present invention can detect a user's gesture using a result received from the sensing unit 140. In particular, the mobile terminal 300 may be able to detect the gesture using a sensing result received through at least one of a proximity sensor, a gyroscopic sensor, a gravity sensor, an acceleration sensor and the like.

Moreover, according to one embodiment of the present invention, if the user takes a gesture 500b of brining the mobile terminal 300 around a user's mouth, it is proposed to automatically switch to a voice recognition mode.

In a step S404, the controller 180 can detect the gesture 500b (i.e., the gesture of bringing the mobile terminal 300 around the user's mouth) of moving the mobile terminal 300 to approach the mouth. If the gesture 500b is not detected, the controller 180 may go back to the step S403. If the gesture 500b is detected, the controller 180 can go to a step S405. In this case, the controller 180 detects that the mobile terminal 300 is proximate to the mouth through the proximity sensor. If the controller 180 detects the proximity, the controller 180 may recognize the gesture 500b of brining the mobile terminal 300 around the mouth. This is just exemplary. And, the embodiments of the present invention are non-limited by the detailed control method of detecting such a gesture.

The voice recognition mode running in the following description may be run by the method mentioned in the foregoing description.

In the step S405, referring to FIG. 5 (c), the controller 180 can enter a voice command recognition mode. In case that the voice command recognition mode is entered, a voice command guide screen 503 can output a guide mention 504 by audio.

If the voice command recognition mode is entered, the controller 180 receives a voice command from the user [S406] and is able to run a function corresponding to the received voice command [S407]. The control method of receiving the voice command and then running the function corresponding to the received voice command in the steps S406 and S407 is described in detail with reference to FIGS. 6 to 7D as follows.

Figure 6:
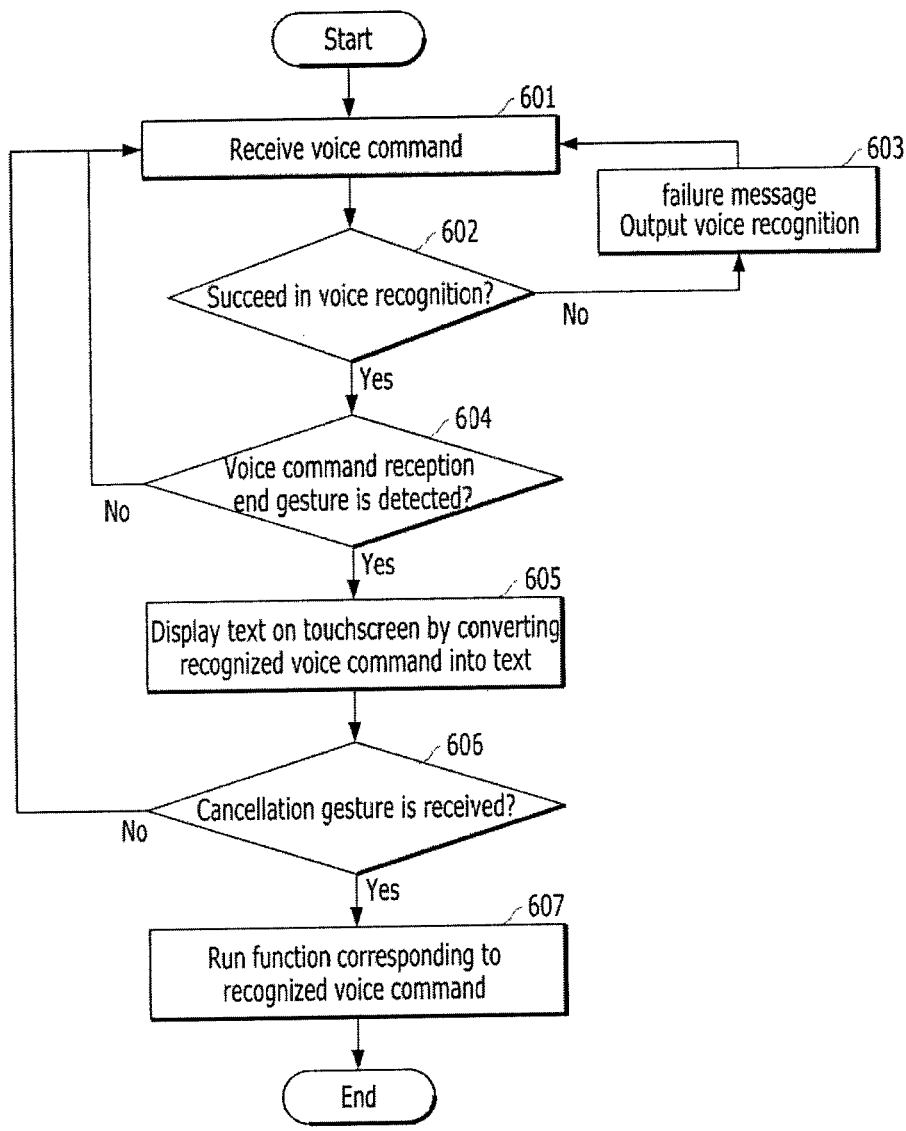
FIG. 6 is a diagram for a control method of running a function corresponding to a voice command if receiving a the voice command from a user according to one embodiment of the present invention.

FIG. 6 is a diagram for a control method of running a function corresponding to a voice command if receiving the voice command from a user according to one embodiment of the present invention. And, FIGS. 7A to 7D are diagrams to describe a flowchart for a control method of running a function corresponding to a voice command if receiving the voice command from a user according to one embodiment of the present invention. The following description shall be made with reference to FIGS. 6 to 7D.

Figure 7A:
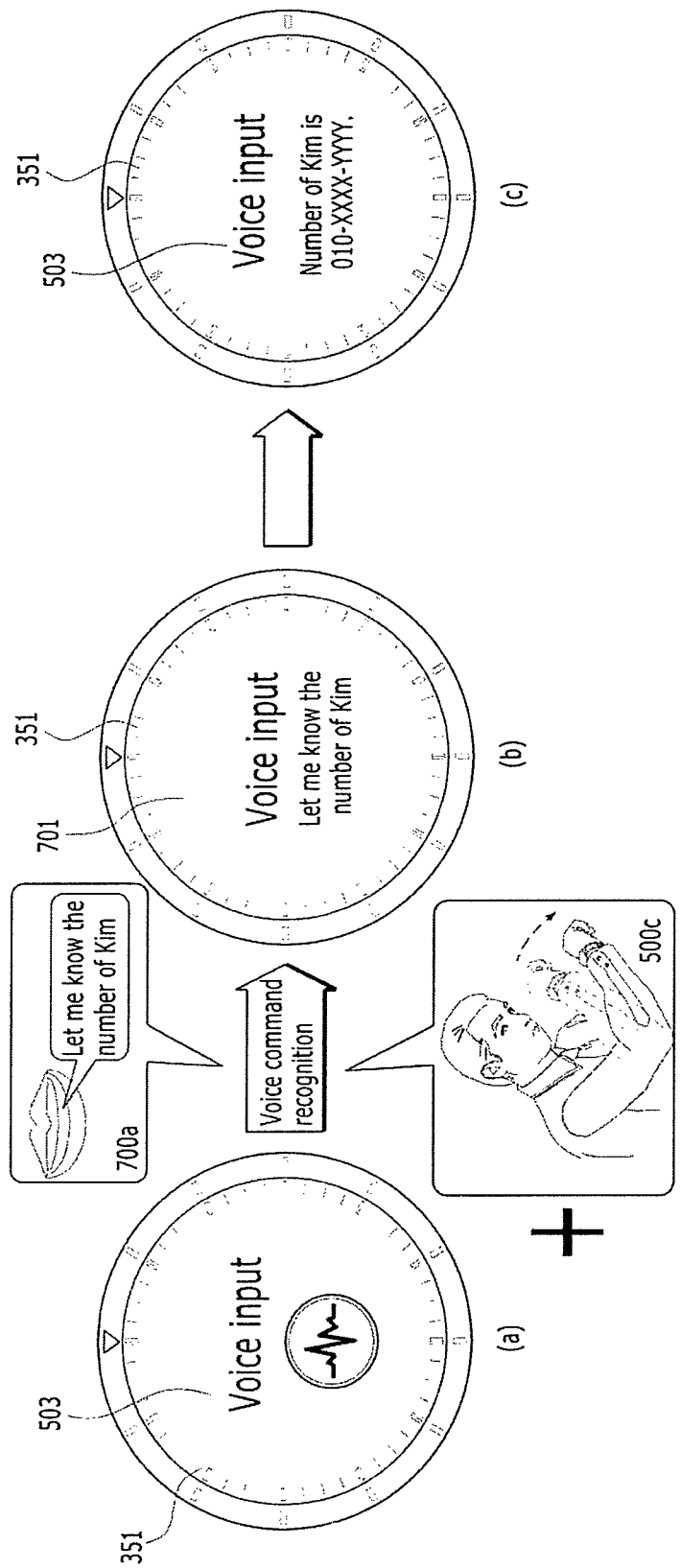
FIGS. 7A, 7B, 7C, 7D show diagrams to describe a flowchart for a control method of running a function corresponding to a voice command if receiving the voice command from a user according to one embodiment of the present invention.

Referring to FIG. 7A (a), the mobile terminal 300 outputs a voice input screen 503, which indicates a state that a voice command can be received from a user, through the touchscreen 351. While the voice input screen 503 is outputted, the controller 180 receives a voice command 700a from the user [S601]. In a step S602, if the controller 180 succeeds in recognizing the received voice command 700a, the controller 180 goes to a step S604. In the step S602, if the controller 180 fails in recognizing the received voice command 700a, the controller 180 goes to a step S603 and is then able to output a voice recognition failure message. And, the voice recognition failure message shall be described in detail with reference to FIG. 7B later.

According to one embodiment of the present invention, in determining an end timing point of the voice command 700a, it is proposed to use a user's gesture. In particular, if a voice command reception end gesture 500c (e.g., a gesture of moving the mobile terminal 300 having approached the mouth away from the mouth) is received from the user [S604], the controller 180 determines that the reception of the voice command 700a has ended and is able to analyze/recognize the voice received in the meantime [S605]. In particular, until receiving the voice command end gesture 500c from the user, the controller 180 can wait for the reception of the voice command 700a. Hence, in the step S604, the voice command reception end gesture 500c is detected. If the voice command reception end gesture 500c is detected, the controller 180 goes to a step S605, converts the recognized voice command 700a into a text, and is then able to output a recognition guide screen 701 containing the converted text. Referring to FIG. 7A (b), a text 'Let me know the number of Kim' converting from the voice command 700a can be outputted through the recognition guide screen 701. In the step S604, if the voice command reception end gesture 500c is not detected, the controller 180 can continue to receive the voice command 700a.

On the other hand, according to another embodiment of the present invention, it is able to turn off a power of the touchscreen 151 (i.e., to deactivate the touchscreen 151) instead of outputting the voice command guide screen 503. When a user inputs the voice command 700a by the method mentioned in the foregoing description, the mobile terminal 300 is brought around a user's mouth. In doing so, the user is unable to watch an output content of the touchscreen 151. In particular, when the voice recognition mode is entered, the controller 180 can automatically deactivate the touchscreen 151. In addition, when the voice recognition mode is entered, the controller 180 may output a sound effect (e.g., a beep sound, etc.) indicating the corresponding entry.

On the other hand, if the voice command reception end gesture 500c is detected, since the mobile terminal 300 is moved away from the mouth, the controller 180 can activate the touchscreen 151 again. In this case, likewise, the controller 180 may be able to output a sound effect to indicate that the voice command has ended.

According to the examples shown in FIGS. 7A to 7D, the voice command 700a includes the command 'Let me know the number of Kim'. After the voice command 700a has been received, if the voice command reception end gesture 500c is received, the controller 180 determines that the input of the voice command has ended and is then able to run a function corresponding to the voice command [S607]. In this case, the corresponding function may include a function of searching a contact database saved in the memory 170 for a contact corresponding to a name 'Kim' and then outputting the found contact. Therefore, referring to FIG. 7A (c), the controller 180 can output the search result to the touchscreen 351 [503].

Meanwhile, according to one embodiment of the present invention, in order to prepare for a case that a voice recognition is not performed correctly (i.e., a case of misrecognition), a control method of outputting a guide voice for enabling a voice to be recognized again or a control method of cancelling a recognized voice is further proposed.

Figure 7B:
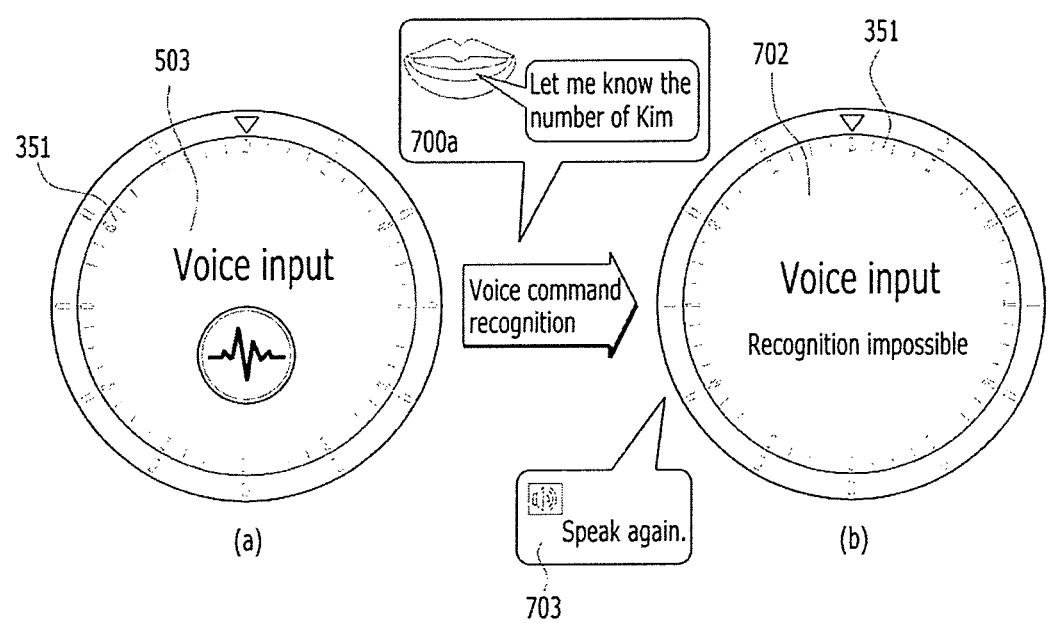

Referring to FIG. 7B (a), the mobile terminal 300 receives a voice command from a user. In this case, if the mobile terminal 300 determines that the received voice command is not recognizable, the mobile terminal 300 can output a screen 702 for guiding a user that the received voice command is not recognizable or a guide voice 703 for requesting to input the voice command again.

In the step S605, the user checks the voice command displayed on the touchscreen. If the checked voice command is not correct, the user can cancel the voice command using a cancellation gesture 500d. According to one embodiment of the present invention, the cancellation gesture 500d is proposed as a gesture of rotating a wrist by making a fist [i.e., a gesture using a hand having the mobile terminal 300 worn thereon].

Figure 7C:
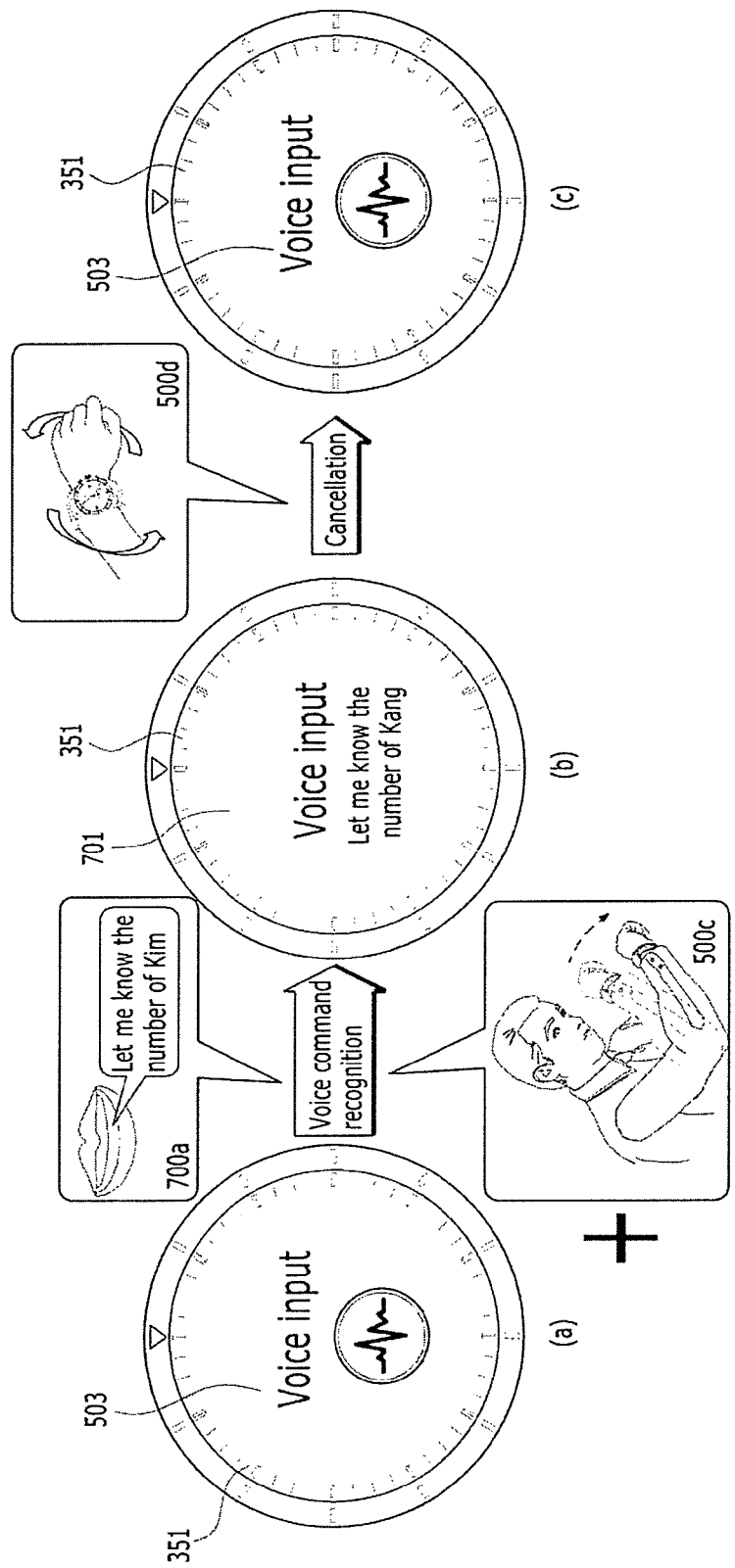

Referring to FIG. 7C, despite that a voice command 'Let me know the number of Kim' is intended, a recognition guide screen 701 'Let me know the number of Kang' is outputted due to misrecognition or the like. Hence, if the user determines that the outputted voice command is different from the voice command intended by the user through the voice guide screen 701, the user cancels the misrecognized voice command using a cancellation gesture 500d and controls a voice recognition receivable state (i.e., the state shown in FIG. 7C (c)) to be re-entered.

Meanwhile, according to one embodiment of the present invention, a control method of pausing a voice recognition state is further proposed.

The mobile terminal 300 of the watch type described in the embodiments of the present invention has the advantage of high portability. In case of the mobile terminal 300 of this type, it may be necessary to consider a control method in a situation that manipulation of the mobile terminal 300 is not facilitated. Hence, according to one embodiment of the present invention, proposed is a control method in consideration of a situation paused in the course of executing a voice command.

Figure 7D:
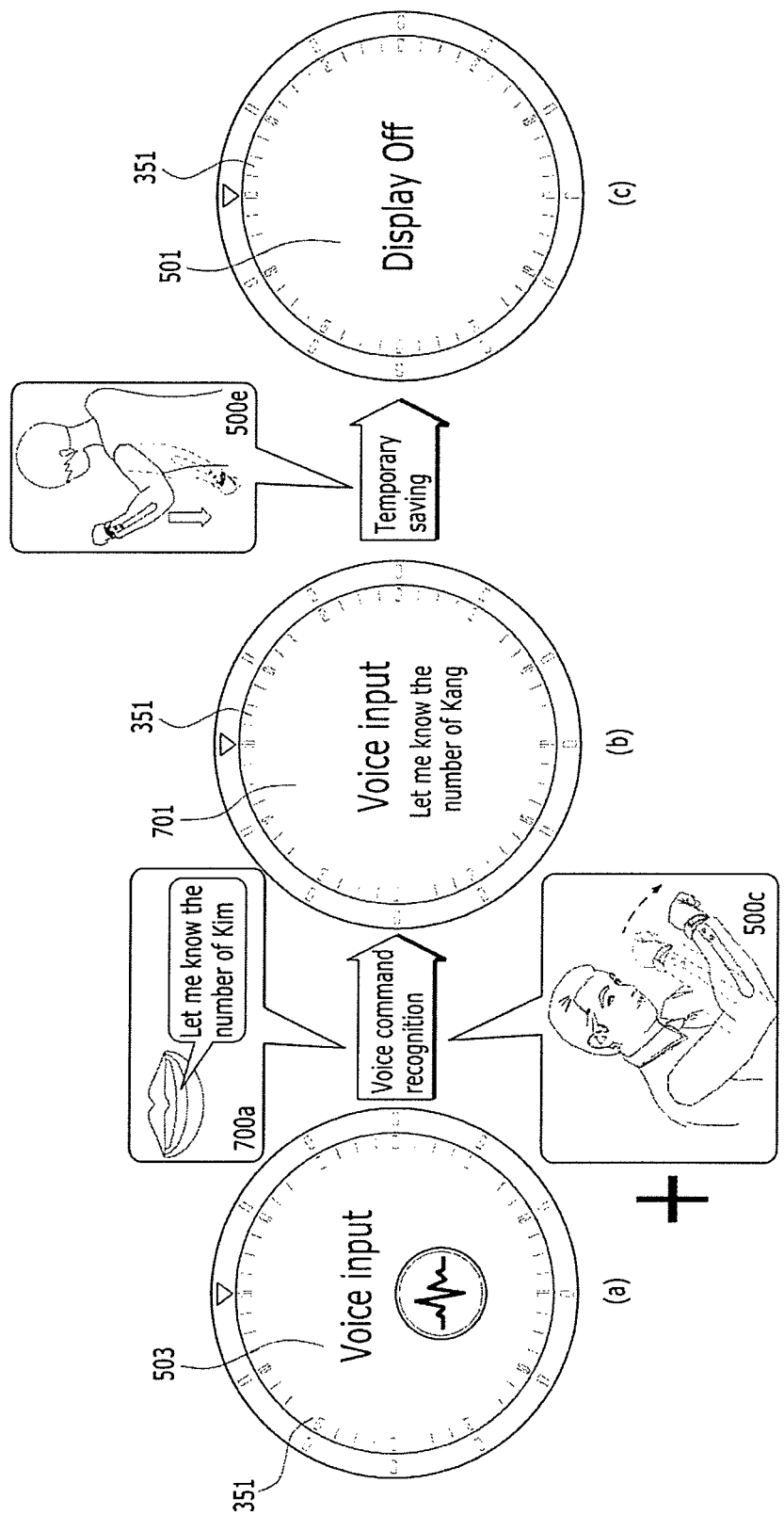

Referring to FIG. 7D, a voice command 700a is received from a user and a recognition guide screen 701 for the received voice command 700a is displayed [FIG. 7D (a), FIG. 7D (b)]. If it is unable to check a result for the voice command 700a due to an external situation, the user can temporarily save a situation of running a corresponding function through a temporary saving gesture 500e. In particular, if the temporary saving gesture 500e (e.g., a gesture of lowering a hand having the mobile terminal 300 worn thereon) is received from the user, the controller 180 saves a state that the function is currently run by the voice command and is able to deactivate the touchscreen 351 [FIG. 7D (c)]. If a resume gesture is received later, the controller 180 can page the saved state.

According to the above-mentioned embodiment, a control method of searching a contact database for a name and a contact using a gesture and a voice command is described. In the following description, a control method of running a memo function using a gesture and a voice command is described.

Figure 8:
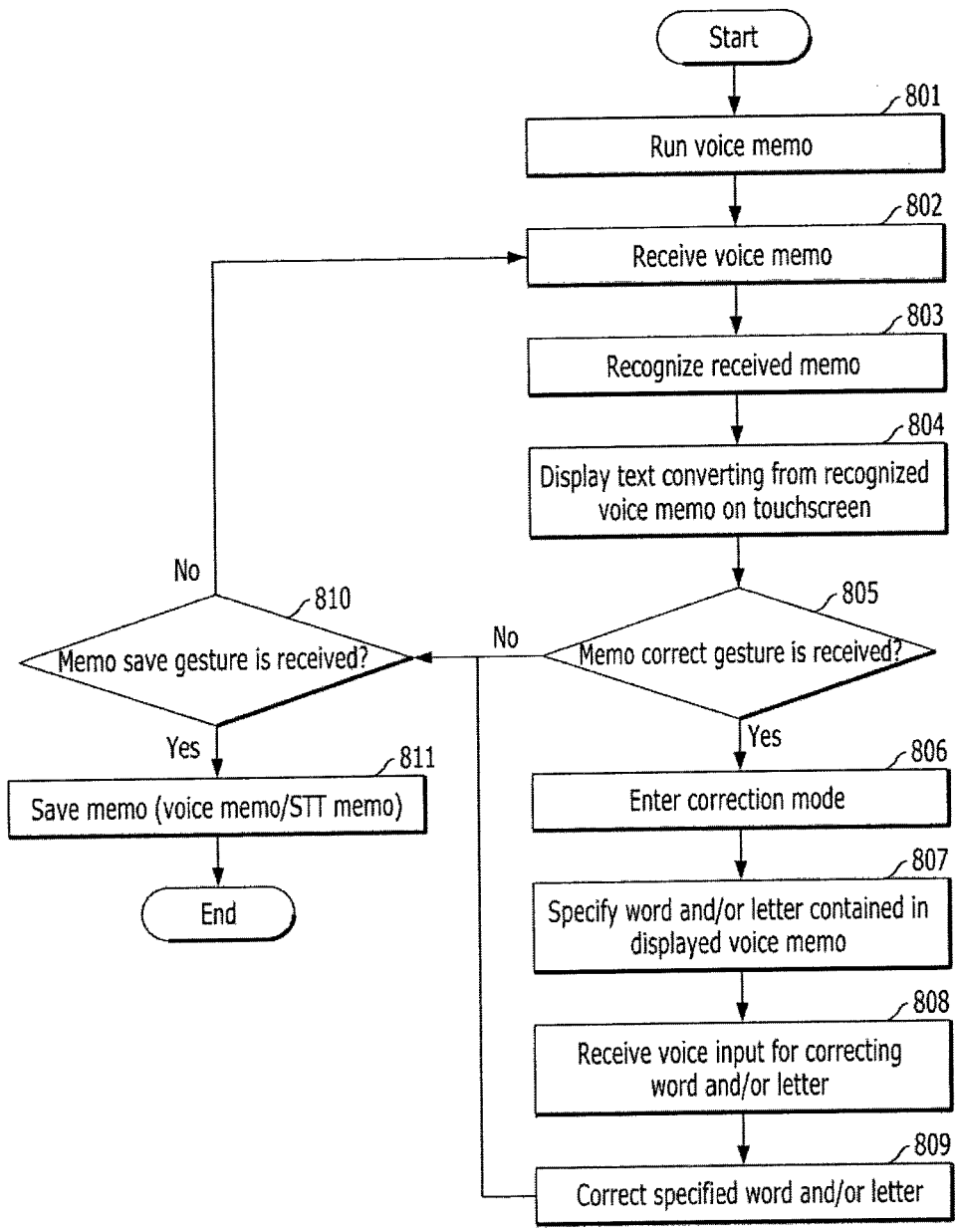
FIG. 8 is a flowchart for a control method of running a memo function using a gesture and a voice command according to one embodiment of the present invention.

FIG. 8 is a flowchart for a control method of running a memo function using a gesture and a voice command according to one embodiment of the present invention. And, FIGS. 9A to 9D are diagrams to describe a flowchart for a control method of running a memo function using a gesture and a voice command according to one embodiment of the present invention. The following description is made with reference to FIGS. 8 to 9D.

Figure 9A:
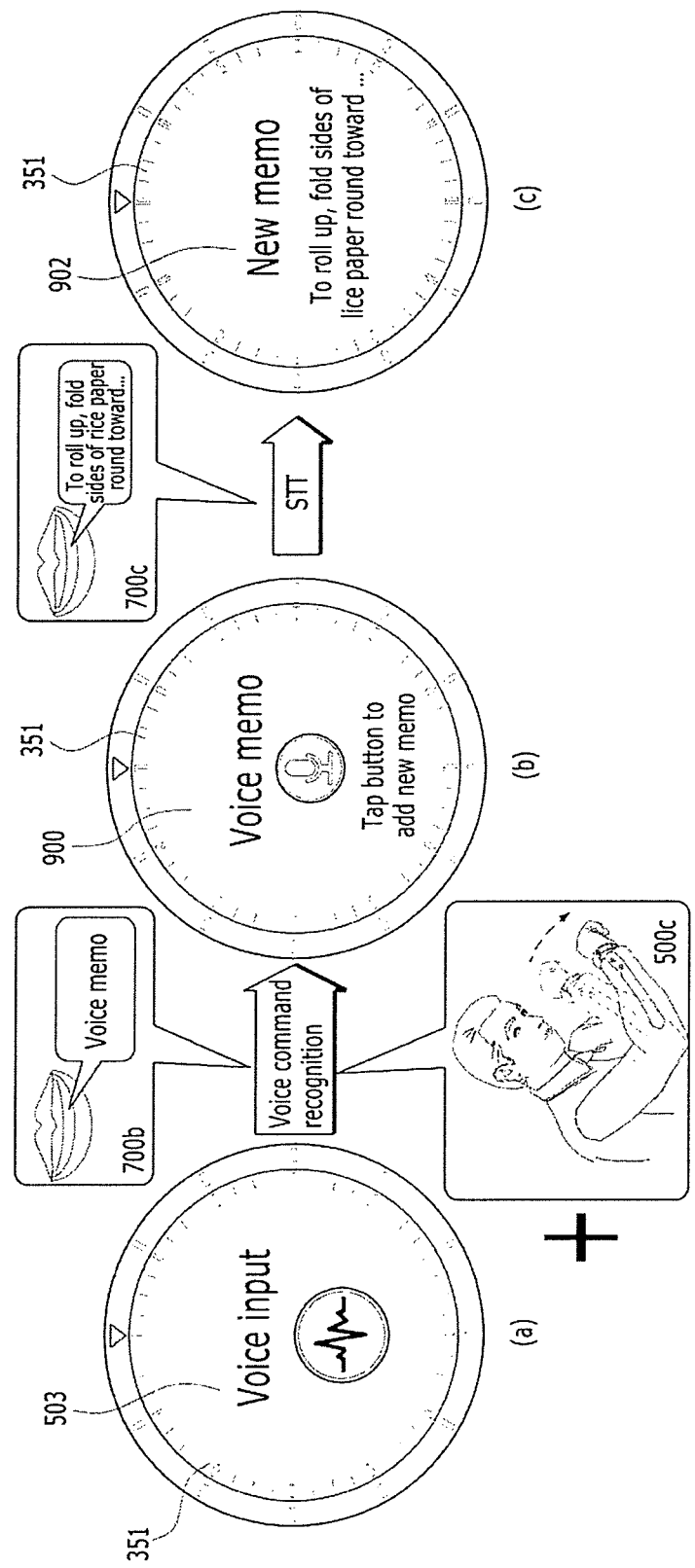
FIGS. 9A, 9B, 9C and 9D show diagrams to describe a flowchart for a control method of running a memo function using a gesture and a voice command according to one embodiment of the present invention.

Referring to FIG. 9A (a), the controller 180 currently outputs a voice command guide screen 503. If a voice command 700b for running a voice memo function is received from a user, the controller 180 runs a voice memo [S801] and outputs a voice memo running screen 900 900

[FIG. 9A (b)]. In this case, the running screen 900 may contain a memo add button 901 for adding a new memo. If the memo add button 901 is selected, the controller 180 can output a memo layer 902 for inputting a new memo.

If a voice memo 700c is received from the user [S802], the controller recognizes the received voice memo 700c [S803] and is able to display the recognized memo on the touchscreen 351 [FIG. 9A (c)] [S804]. In particular, the controller 180 converts the recognized memo into a text and then displays the corresponding text on the touchscreen 351.

On the other hand, like the case of the misrecognition of the voice command, it may be possible for the voice memo to be misrecognized. Therefore, according to one embodiment of the present invention, further proposed is a control method of cancelling an inputted voice memo.

Figure 9B:
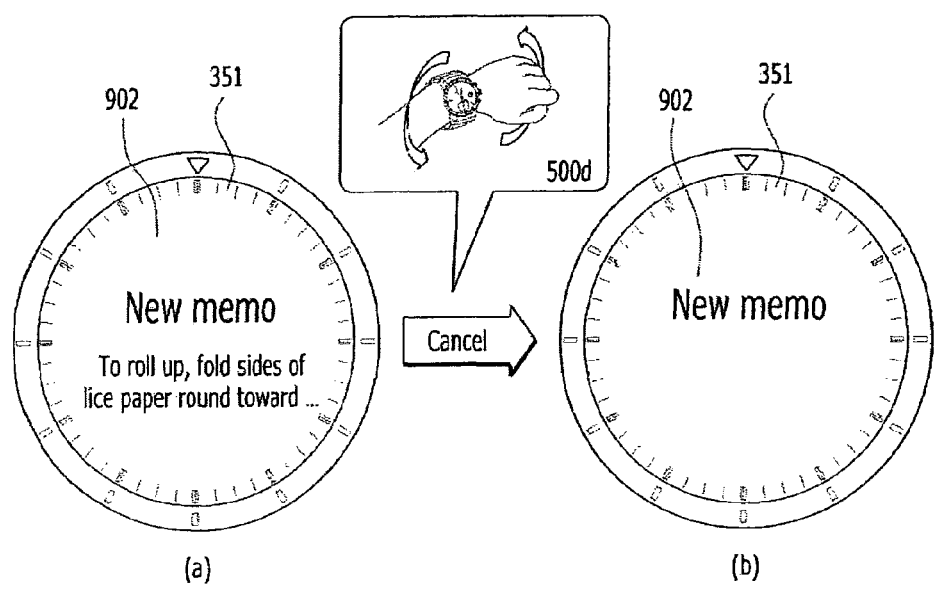

Referring to FIG. 9B (a), the controller 180 recognizes a voice memo 700c received from a user and then displays it on the touchscreen 351. If the user recognizes that the recognized voice memo is incorrect, referring to FIG. 9B (b), the user can delete the inputted voice memo using a cancellation gesture 500d.

Furthermore, according to one embodiment of the present invention, further proposed is a control method of correcting a portion of an inputted voice memo as well as a control method of cancelling a whole inputted voice memo. In particular, the controller 180 determines whether a memo correct gesture is received [S805]. If the memo correct gesture is received, the controller 180 goes to a step S806 and enters a correction mode for correcting a memo. The memo correction mode shall be described in detail with reference to FIG. 10A, FIG. 10B, FIG. 11, FIG. 12A, FIG. 12B, FIG. 13 and FIG. 14 later. If the memo correct gesture is not received, the controller 180 goes to a step S810.

In the step S810, the controller 180 determines whether a memo save gesture is received. If the memo save gesture is not received, the controller 180 goes back to the step S802 in order to continue to receive the voice memo. If the memo save gesture is received, the controller 180 goes to a step S811 to perform a saving operation. In case of the saving operation, the voice memo can be saved as a text form converting from the voice memo as well as an audio form of recording the received voice memo itself. A configuration diagram related to the saving operation is described in detail with reference to FIG. 9C as follows.

Figure 9C:
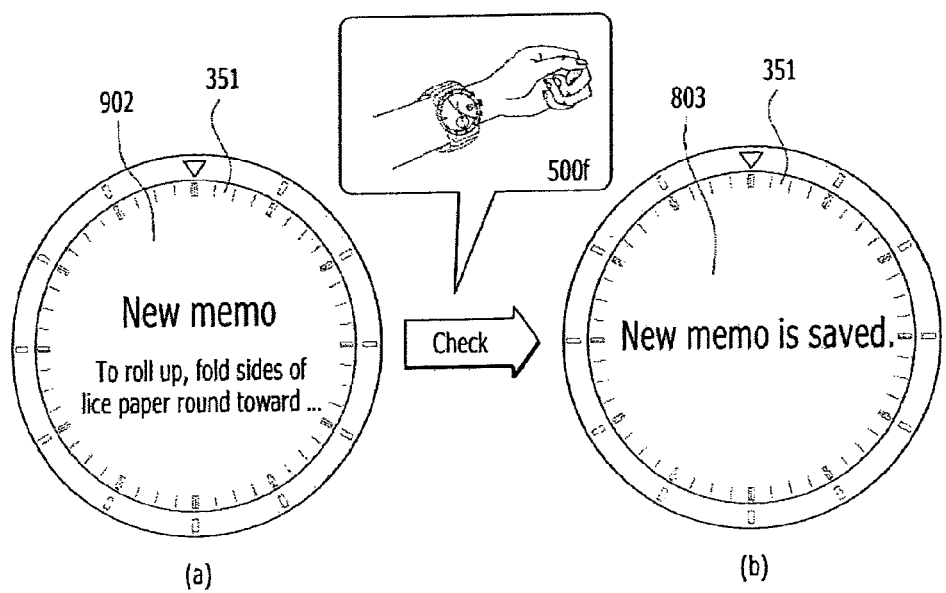

Referring to FIG. 9C (a), the controller 180 displays a recognized voice memo on a memo layer 902. If a memo save gesture 500f is received from a user, referring to FIG. 9C (b), the controller 180 can save the displayed voice memo. According to one embodiment of the present invention, a gesture of opening a hand having the mobile terminal 300 worn thereon and then making a fist is proposed as the memo save gesture 500f.

Meanwhile, as mentioned in the foregoing description with reference to FIG. 7D, while a user is inputting a memo, the user may desire to pause the memo input due to an external situation. A control method in consideration of such a situation is described in detail with reference to FIG. 9D as follows.

Figure 9D:
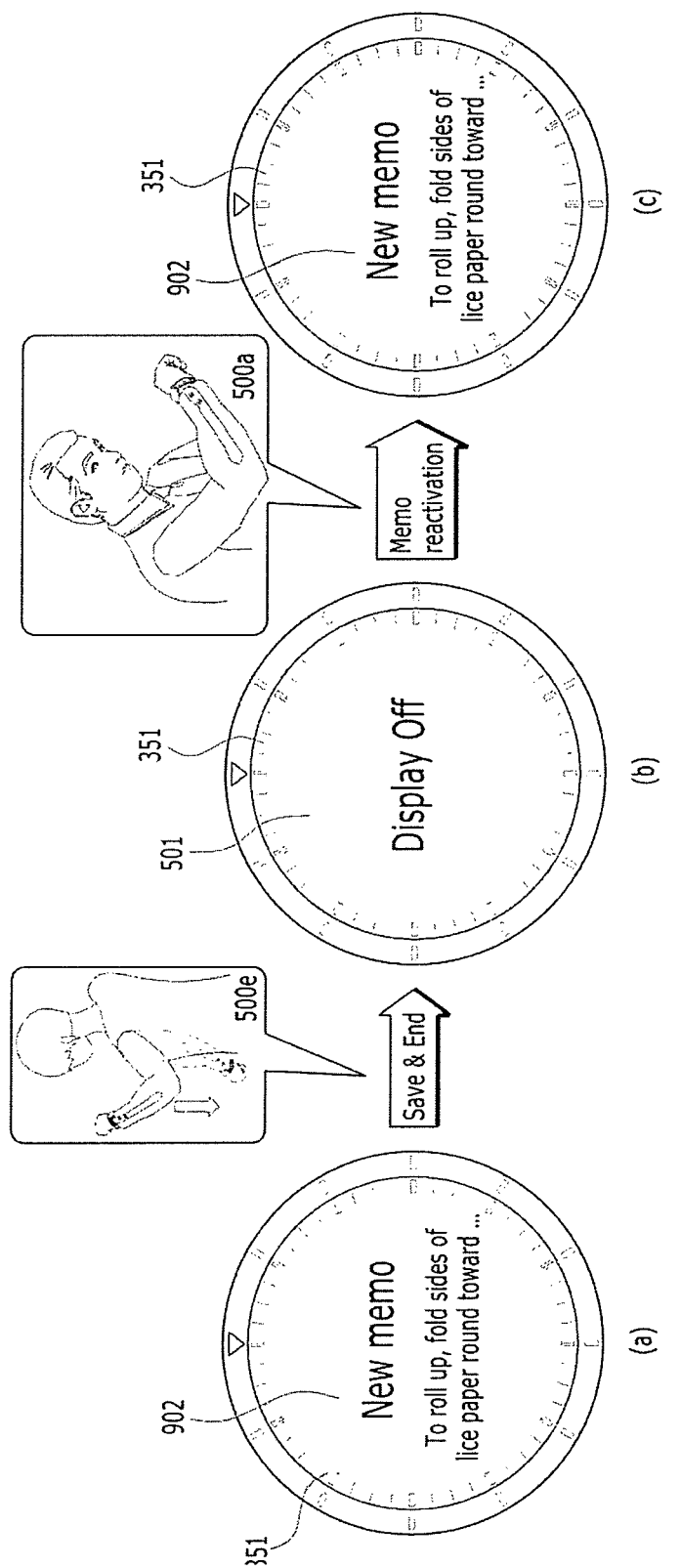

Referring to FIG. 9D (a), the controller 180 displays a recognized voice memo on a memo layer 902. If a temporary saving gesture 500e is received, the controller 180 saves a currently inputted voice memo and is able to switch a current state of the mobile terminal 300 to a deactivated state (i.e., the aforementioned idle state). In particular, in the idle state, the controller 180 can turn off the power of the touchscreen 351.

Thus, after a memo input has been paused by the temporary saving gesture 500e in the course of inputting a voice memo, if a gesture (e.g., the aforementioned time check gesture 500a) for re-activation is received, the controller 180 summons the saved memo and is then able to display the corresponding memo on the touchscreen 351.

Alternatively, a method of deactivating/activating the touchscreen 351 only may be available as well as the saving & re-displaying method. In particular, in case that the temporary saving gesture 500e is received, the controller 180 deactivates the touchscreen 351 only without deactivating a voice memo function. Thereafter, in response to a reception of the time check gesture 500a, if the deactivated touchscreen 351 is re-activated, the voice memo function previously used for the voice memo input can be used again.

In the following description, a control method of correcting a recognized voice memo is described in detail with reference to FIG. 10A, FIG. 10B, FIG. 11, FIG. 12A, FIG. 12B, FIG. 13 and FIG. 14.

Figure 10A:
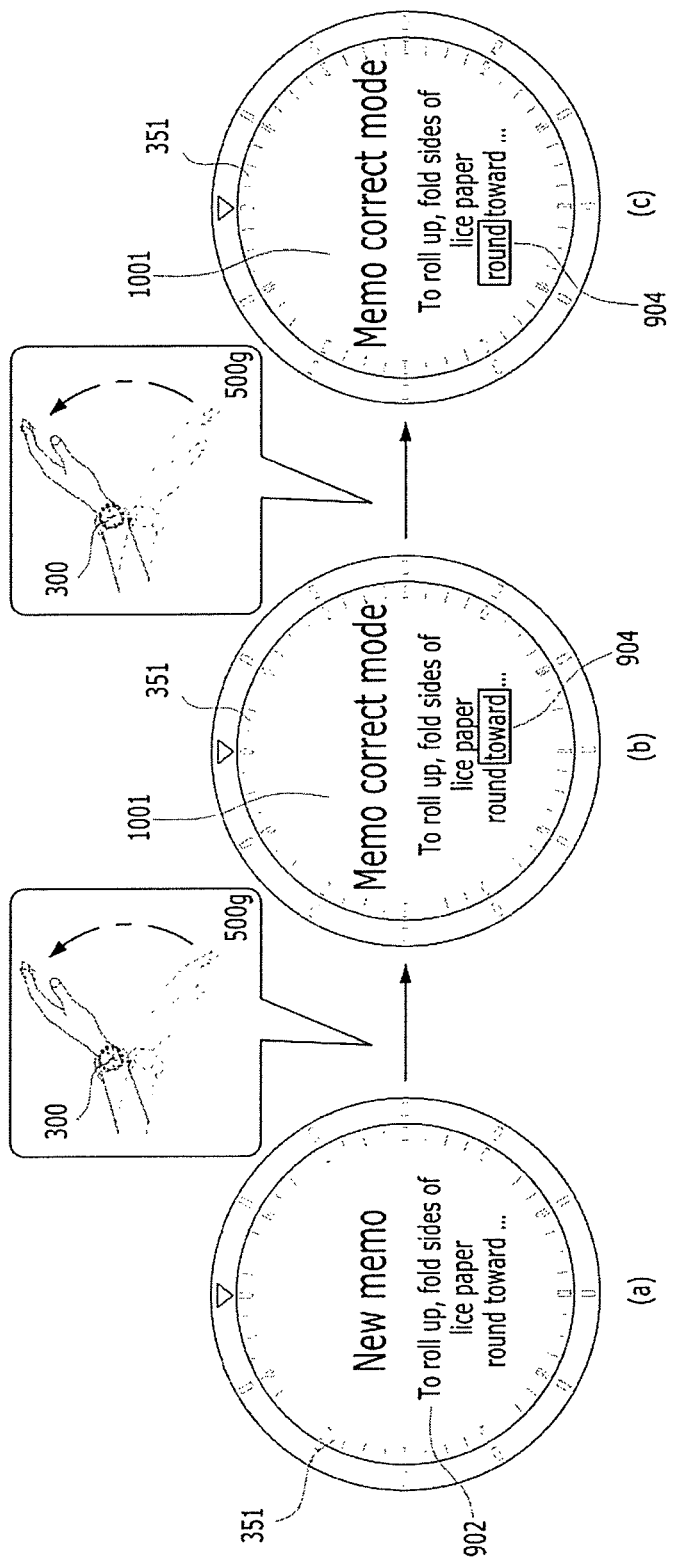

FIG. 10A and FIG. 10B are diagrams for a control method of selecting a word to correct in correction mode according to one embodiment of the present invention.

According to one embodiment of the present invention, a voice memo received from a user is displayed on the touchscreen 351 by being converted into a text. If misrecognition occurs in the course of converting the voice memo, a control method of correcting it per word is proposed. In particular, FIG. 10A and FIG. 10B show a control method of selecting a word to correct. The following description is made with reference to the steps S805 to 809 of the flowchart shown in FIG. 8.

In the steps S805, the controller 180 determines whether a memo correct gesture is received. In this case, the memo correct gesture may mean a gesture for entering a correction mode. According to one embodiment of the present invention, as the memo correct gesture, proposed is a gesture 500g of bending a wrist upward while wearing the mobile terminal 300. If the correction mode is entered, referring to FIG. 10A (b), the controller 180 outputs a memo correct screen 1001 and is also able to output a word select cursor 904 to the memo correct screen 1001. In particular, the controller 180 specifies a word using a location of the word select cursor 904 [S807] and is then able to perform a correction job on the specified word [S808, S809].

According to one embodiment of the present invention, using a gesture of bending a wrist upward or downward, it is proposed to adjust a location of the word select cursor 904. In particular, according to one embodiment of the present invention, if the gesture 500g of bending the wrist upward is received, the controller 180 may shift a location of the word select cursor 904 to the left [FIG. 10A (b), FIG. 10A (c)]. If a gesture 500h of bending the wrist downward is received, the controller 180 may shift a location of the word select cursor 904 to the right [FIGS. 10B (a) to 10B (c)]. A control method of specifying a word using the word select cursor 904 and then correcting the specified word is described in detail with reference to FIG. 11 as follows.

Figure 11:
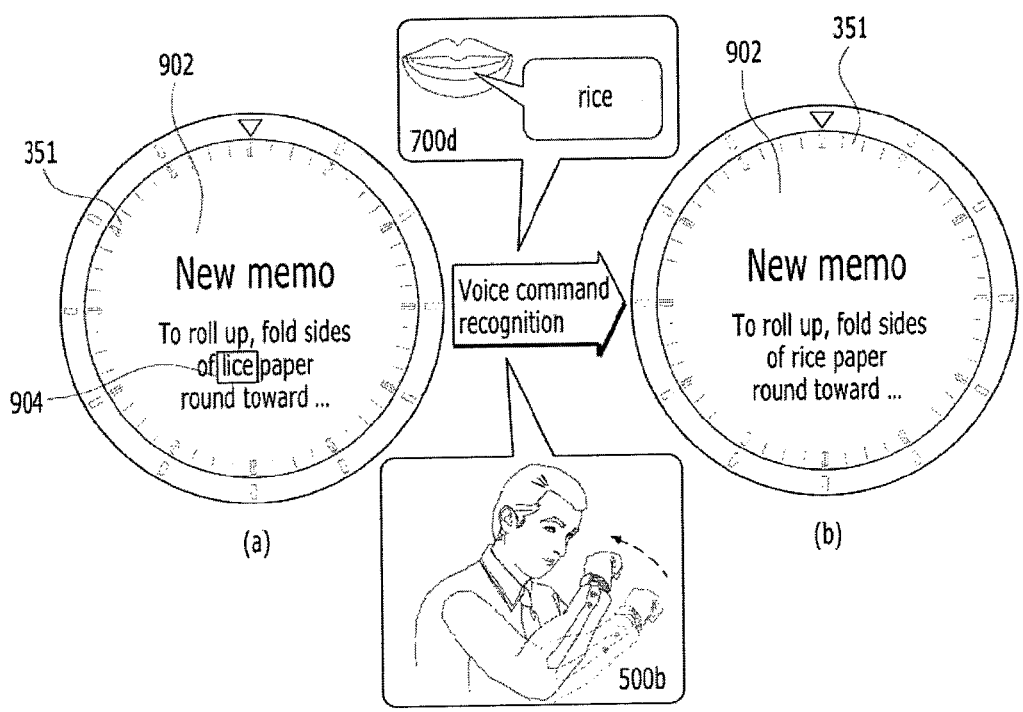
FIG. 11 shows diagrams for a control method of correcting a prescribed word specified using a word selection cursor 904 according to one embodiment of the present invention.

FIG. 11 is a diagram for a control method of correcting a prescribed word specified using the word selection cursor 904 according to one embodiment of the present invention.

Referring to FIG. 11 (a), the controller 180 currently displays a recognized voice memo on a memo layer 902. The word select cursor 904 is located at a word 'lice' contained in the recognized voice memo.

After a gesture 500b of bringing around a mouth has been received, if a voice memo 'rice' 700d is received from a user [S808], referring to FIG. 11 (b), the controller 180 can correct the word specified by the word select cursor 904 into the voice memo 'rice' 700*d* [S809].

Meanwhile, although the above-described embodiment proposes the gesture of bending the wrist upward or downward is proposed as the gesture for shifting the location of the word select cursor 904, the location of the word select cursor 904 can be shifted by a different method shown in FIG. 12A and FIG. 12B.

FIG. 12A and FIG. 12B are diagrams for a control method of controlling a location of the word selection cursor 904 according to another embodiment of the present invention.

Referring to FIG. 12A, when a memo correct gesture 500*g* is received, the controller 180 enters a memo correct mode shown in FIG. 12A (b) and is then able to display a memo correct screen 1201. If a voice input 'lice' 700*d* is received from a user, referring to FIG. 12 (c), the controller 180 specifies a word corresponding to the voice input 'lice' 700*d* in the voice memo currently converted into a text and is then able to control the word select cursor 904 to be located at the specified word. After the prescribed word has been specified by the word select cursor 904, a control method of correcting the word may be identical to that of the former description with reference to FIG. 11.

Referring to FIG. 12B, when the memo correct gesture 500*g* is received, the controller 180 is able to display the memo correct screen 1201 by entering the memo correct mode shown in FIG. 12A (b). if a voice input '4 spaces backward' 700*k* is received from the user, the controller 180 can control the word select cursor 904 to be located at a location shifted from a prescribed reference location by 4 spaces. In this case, the prescribed reference location may become a last end of a voice memo inputted by being converted into a text or a location of the currently displayed word select cursor 904. After a prescribed word has been specified by the word select cursor 904, a control method of correcting the word may be identical to that of the former description with reference to FIG. 11.

So far, the control method of correction by word units is described. In the following description, a control method of correction by letter units is described in detail with reference to FIG. 13 and FIG. 14.

Figure 13:
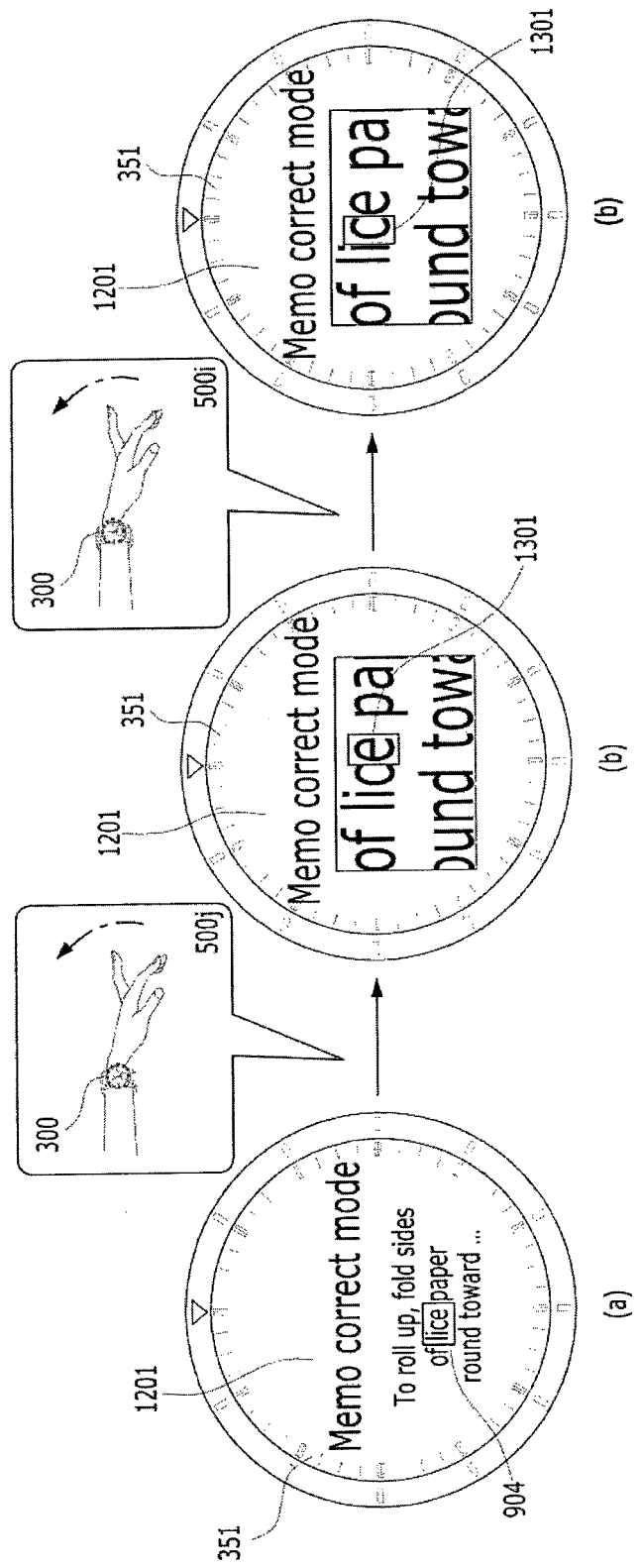
FIG. 13 shows diagrams for a control method of correcting a voice memo converted to a text by letter units according to one embodiment of the present invention.

FIG. 13 is a diagram for a control method of correcting a voice memo converted into a text by letter units according to one embodiment of the present invention.

Referring to FIG. 13 (a), the controller 180 currently displays a recognized voice memo on a memo layer 902. The word select cursor 904 is located at a word 'lice' contained in the recognized voice memo. According to one embodiment of the present invention, it is proposed to shift a cursor by letter units using a gesture of bobbing a finger.

In particular, referring to FIG. 13, if a gesture 500*j* of bending up a finger is received, a letter select cursor 1301 indicating a prescribed letter on a word specified by the word select cursor 904 can be outputted. If the gesture 50*j* of bending up a finger is additionally received, the letter select cursor 1301 can be shifted to the left. If the gesture 50*j* of bending down a finger is additionally received, the letter select cursor 1301 can be shifted to the right [FIG. 13 (c)].

Figure 14:
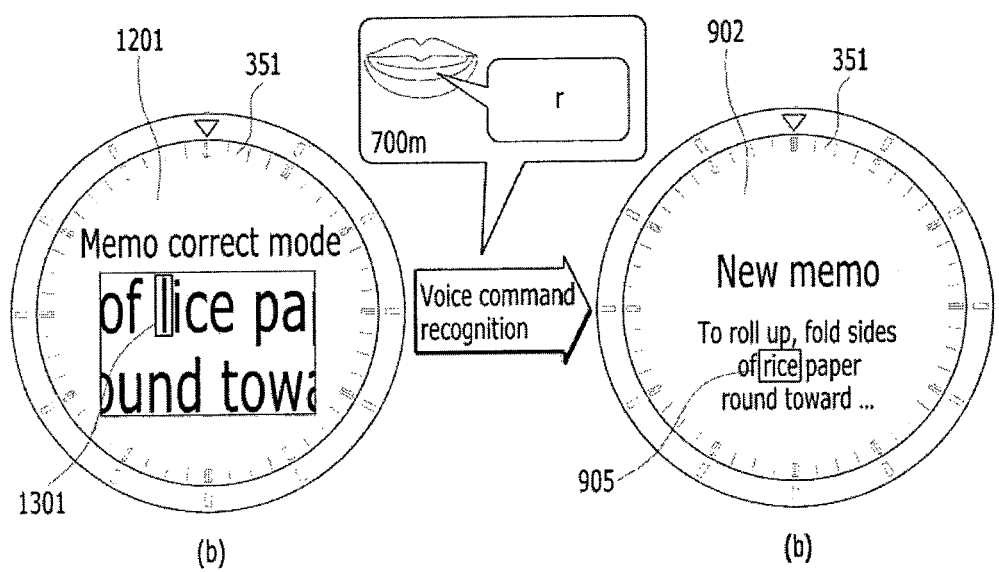
FIG. 14 shows diagrams for a control method of correcting a letter selected by a letter select cursor 1301 according to one embodiment of the present invention.

FIG. 14 is a diagram for a control method of correcting a letter selected by the letter select cursor 1301 according to one embodiment of the present invention.

Referring to FIG. 14 (a), the controller 180 currently displays a recognized voice memo on a memo layer 902. A letter 'l' of a word 'lice' contained in the recognized voice memo is specified by the letter select cursor 1301.

If a voice input 'r' 700*m* is received from a user, the controller 180 can change the letter 'l' specified by the letter select cursor 1301 into 'r' [905] [FIG. 14 (b)].

Memos saved by the above-described methods can be managed in list forms. Such a management control method shall be described in detail with reference to FIG. 15 as follows.

Figure 15:
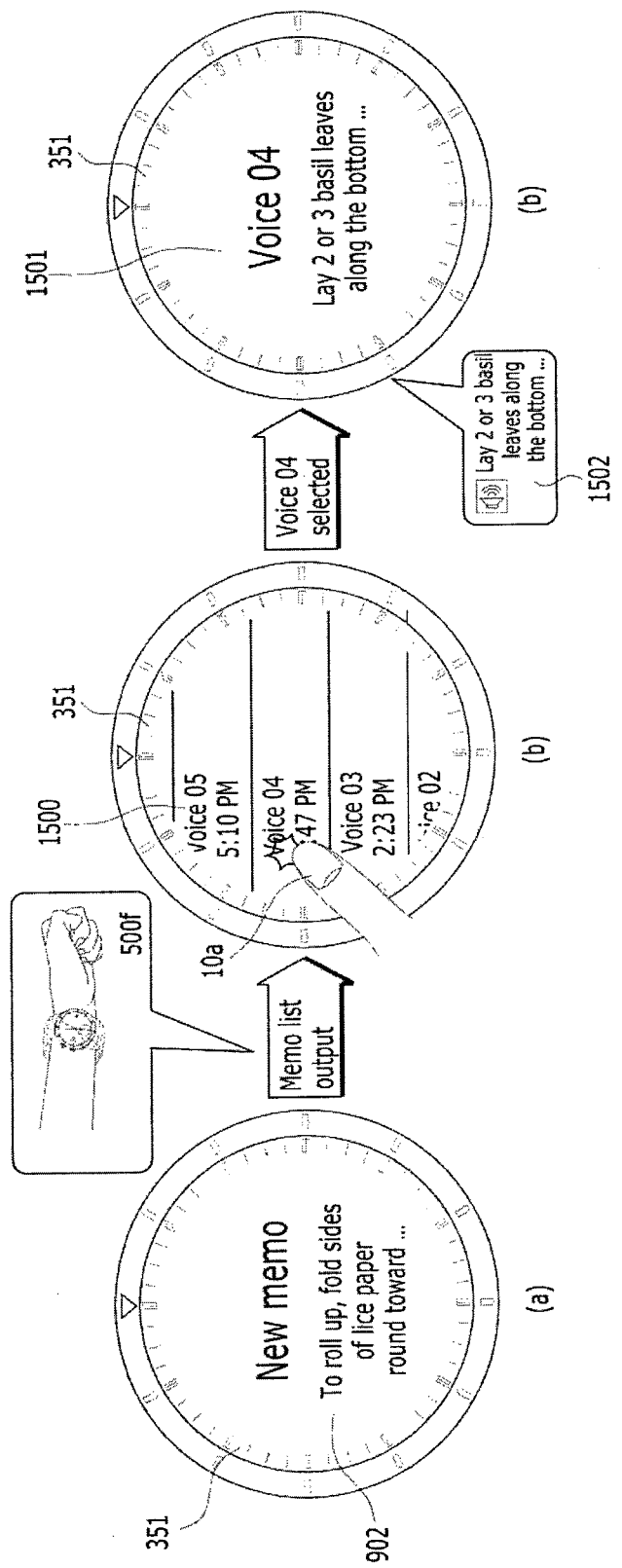
FIG. 15 shows diagrams for a control method of managing a saved voice memo according to one embodiment of the present invention.

FIG. 15 is a diagram for a control method of managing a saved voice memo according to one embodiment of the present invention.

Referring to FIG. 15 (a), the controller 180 currently displays a recognized voice memo on a memo layer 902. If a memo list output gesture 500*f* is received, referring to FIG. 15 (b), the controller 180 can output a list 1500 of saved memos.

If an input 10*a* for selecting a prescribed memo from the outputted list is received, the controller 180 can output a memo display screen 1501 having the selected memo displayed thereon and may further output a voice memo 1502 saved in audio form for the corresponding memo as well.

According to another embodiment of the present invention, a control method of providing a function of translation between languages through a gesture and a voice input is described in detail as follows.

Figure 16:
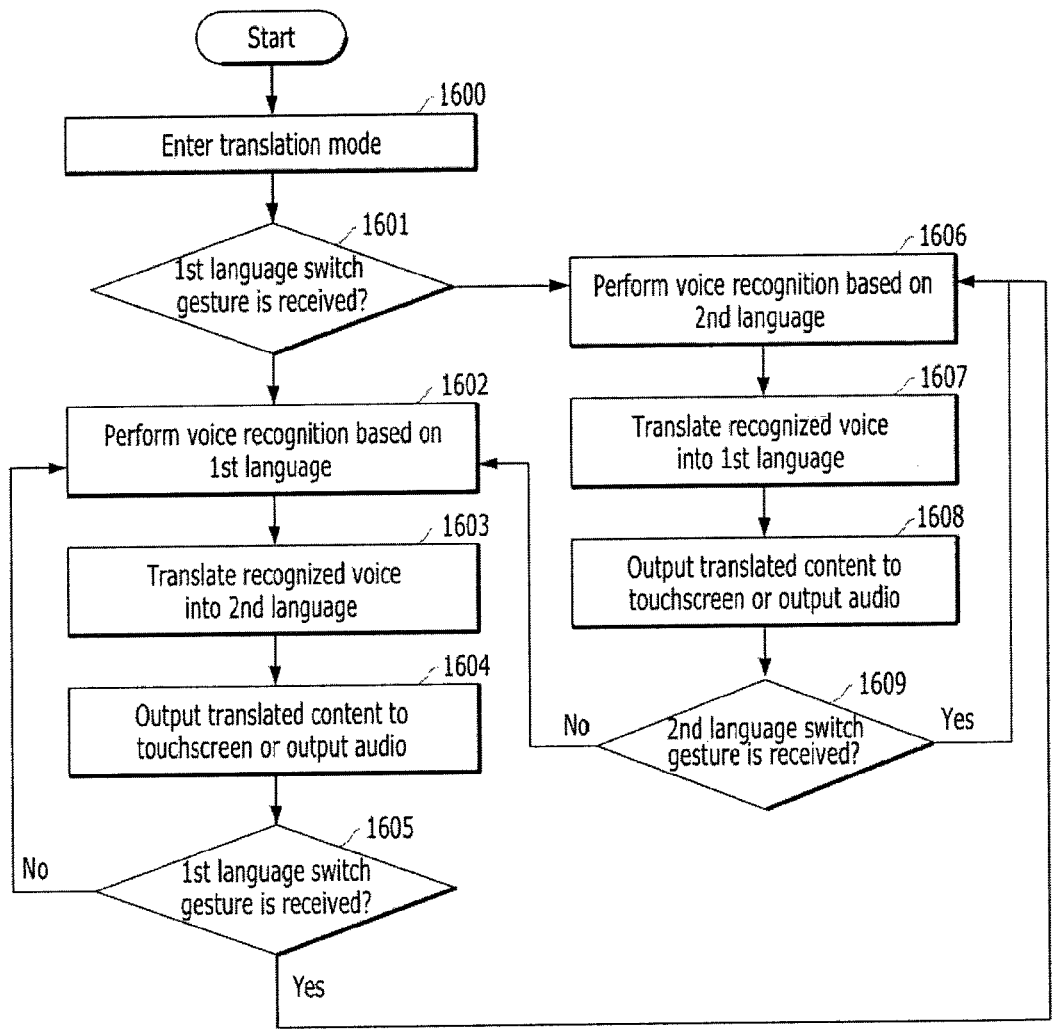
FIG. 16 is a flowchart for a control method of providing a translation function based on a gesture and a voice input according to one embodiment of the present invention.

FIG. 16 is a flowchart for a control method of providing a translation function based on a gesture and a voice input according to one embodiment of the present invention. And, FIG. 17 is a diagram for configuration of a control method of providing a translation function based on a gesture and a voice input according to one embodiment of the present invention.

Referring to FIG. 17 (a), the mobile terminal 300 enters a voice recognition mode and is able to output a voice command guide screen 503.

Meanwhile, in order to recognize a voice input received from a user, a setting for a corresponding voice should be made. For instance, in order to recognize Korean, a voice recognition function should be set for Korean. In particular, when the voice recognition function set for Korean is run, a voice input received in English may not be recognizable.

In recognizing a voice input received from a user, the recognition is firstly performed based on a first language (e.g., Korean). If a voice input 700*e* for running an English translation function is received from a user, the controller 180 recognizes the voice input 700*e* based on the first language. The controller 180 enters an English translation mode based on the recognized voice input 700*e* [S1600] and is then able to output a translation mode screen 1701 through the touchscreen 351. And, the controller 180 can output a translation guide mention 1702 through the audio output unit 152.

When the English translation mode is entered, the controller 180 determines whether a first language switch gesture 500*k* is detected [S1601]. If the first language switch gesture 500*k* is detected, the controller 180 goes to a step S1606 and is then able to perform a voice recognition based on a second language. The first language switch gesture 500 shall be described in detail later.

Although the English translation mode is entered, the language setting may not be changed. The reason for this is that a translation can be attempted to the second language from the first language. In particular, if the first language switch gesture 500*k* is not detected in the step S1601, the controller 180 goes to the step S1602 and is then able to continue to perform the voice recognition based on the first language. Hence, if a voice input is received, the controller 180 recognizes the corresponding voice input based on the first language [S1602] and is then able to translate the recognized voice into the second language [S1603]. The controller 180 is then able to output the translated content through the touchscreen 351 or the audio output unit 152 [S1604].

According to one embodiment of the present invention, it is proposed to change the language setting of a voice recognition using a gesture with a hand having the mobile terminal 300 worn thereon. In particular, if the first language switch gesture 500k is received [S1605], the controller 180 can automatically change the first language setting into the second language setting.

According to the example shown in FIG. 17, the voice recognition is currently set to Korean in FIG. 17 (a) and FIG. 17 (b). If the first language switch gesture 500k is received, the controller 180 can switch the language setting of the voice recognition from the first language (e.g., Korean for the example shown in FIG. 17) to the second language (e.g., English for the example shown in FIG. 17) [S1606]. Subsequently, the controller 180 outputs a translation mode screen 1701 in the second language [1703] and is also able to output a translation guide mention 1702 as translated into the second language [1704].

According to one embodiment of the present invention, the first language switch gesture 500k may include a gesture performed in a manner that a user of the mobile terminal 300 proffers the mobile terminal 300 worn by the user to another person. For another example, the first language switch gesture 500k may include a gesture of moving the touchscreen 351 of the mobile terminal 300 to be watched by another person. For further example, the first language switch gesture 500k may include a gesture of moving the microphone 122 of the mobile terminal 100 to facilitate a voice input from another person. In particular, the first language switch gesture 500k may include a gesture for requesting a voice recognition in the second language by holding out an arm to another user while wearing the mobile terminal 300.

Meanwhile, a detection of a gesture applicable to embodiments of the present invention may require a condition that the received gesture is held for a while (i.e., the gesture is held over a prescribed time without moving). In particular, the holding is required as an end timing point of the gesture detect. If the case of the first language switch gesture 500k is taken as an example, after the mobile terminal 300 has been proffered to another person, only if the holding is detected, the controller 180 can detect it as the first language switch gesture 500k.

On the other hand, if a second language switch gesture is received [S1609], the second language setting may be changed into the first language (i.e., return to the step S1602). The second language switch gesture shall be described in detail with reference to FIG. 19 later.

FIG. 18A and FIG. 18B are diagrams for a control method of outputting a voice input recognized as a second language by translating it into a first language according to one embodiment of the present invention.

Referring to FIG. 18A (a), a translation mode screen 1703 is outputted in the second language. After a voice input 700f has been received in the second language, if a second language switch gesture 500m is received, referring to FIG. 18A (b), the controller 180 can translate the voice input 700f received in the second language and is then able to provide the corresponding outputs 1801 and 1802. In particular, the controller 180 may provide the output 1801 of the translated content through the touchscreen 351 and/or may further provide the audio output 1802 of the translated content.

According to one embodiment of the present invention, the second language switch gesture 500m may include a gesture of drawing the mobile terminal 300 proffered to another person back to a user's location again. For another example, the second language switch gesture 500m may include a gesture of moving the touchscreen 351 of the mobile terminal 300 in order for a user of the mobile terminal 300 to watch the touchscreen 351. For further example, the second language switch gesture 500m may include a gesture of moving the microphone 122 of the mobile terminal 100 to facilitate an input of a voice of a user of the mobile terminal 100. In particular, as the microphone 122 gets closer to the user of the mobile terminal 100, a reception of the voice input of the user of the mobile terminal 100 is facilitated more than a voice input from another person. Namely, the second language switch gesture 500m includes a gesture of drawing the arm proffered to anther user toward the user of the mobile terminal 300 currently wearing the mobile terminal 300.

According to one embodiment of the present invention, it is able to further output a save icon 1803 for saving translation data of the translated content. If an input of selecting the save icon 1803 is received, the controller 180 saves the translation data and is able to output a screen 1804 for indicating that the translation data is saved [FIG. 18A (c)]. Meanwhile, the translation data may include at least one of a voice input received in a first language, a data of a text converting from a received and recognized voice input, and a data of a converted text translated into a second language. And, the saved translation data may be read in form of a list shown in FIG. 18B.

Referring to FIG. 18B (a), the controller 180 outputs a screen 1804 indicating that a voice content is saved through the touchscreen 351. If a list output gesture 500n is received, the controller 180 can output a list 1805 of the saved translation data. If an input 10b of selecting a prescribed translation data from the list 1805 of the translation data is received, the controller 180 can provide outputs 1801 and 1802 of the selected translation data.

Each item include in the list can be saved by being distinguished with reference to a timing point of detecting the first language switch gesture 500k or the second language switch gesture 500m. In particular, while a voice input is received, if the first language switch gesture 500k or the second language switch gesture 500m is detected, a voice input up to the timing point of the detection can be saved as a single item. Furthermore, after a first voice input has been received, the first voice input stops being received over a prescribed time. In doing so, a second voice input starts to be additionally received. While the second voice input is received, if the first language switch gesture 500k or the second language switch gesture 500m is detected, the second voice input is ignored but the first voice input can be saved as a single item only. The reason for this is that, if a gesture is detected in the course of receiving the second voice input, the second voice input can be determined as intended not to be saved.

According to one embodiment of the present invention, the list output gesture may include a gesture 500n of rotating a wrist having the mobile terminal 300 worn thereon clockwise and counterclockwise.

The embodiment mentioned in the above description relates to an embodiment of translation into a first language from a second language. Moreover, an embodiment of translation into the second language from the first language is also possible. Such an embodiment is described in detail with reference to FIG. 19 as follows.

Figure 19:
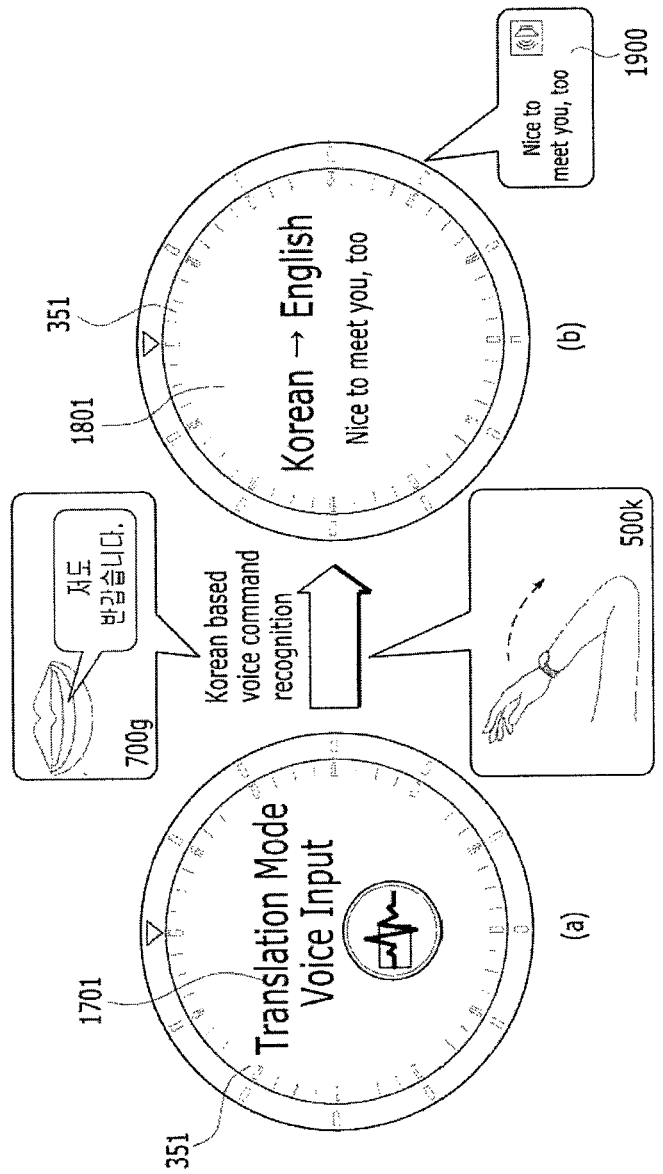
FIG. 19 shows diagrams for a control method of translating a first language into a second language according to one embodiment of the present invention.

FIG. 19 is a diagram for a control method of translating a first language into a second language according to one embodiment of the present invention.

Referring to FIG. 19 (a), the mobile terminal 300 has entered a translation mode and currently outputs a translation mode screen 1701. After a voice input 700g in a first language has been received, if a first language switch gesture 500k is detected, the controller 180 recognizes the received voice input 700g based on the first language, translates the recognized voice input, and is then able to provide outputs 1801 and 1900 of the translation.

Meanwhile, a user may desire to listen to the translated output again. According to one embodiment of the present invention, if a case that a user desires to listen to is detected, it is proposed to re-speak the received voice command. Such an embodiment is described in detail with reference to FIG. 20 as follows.

Figure 20:
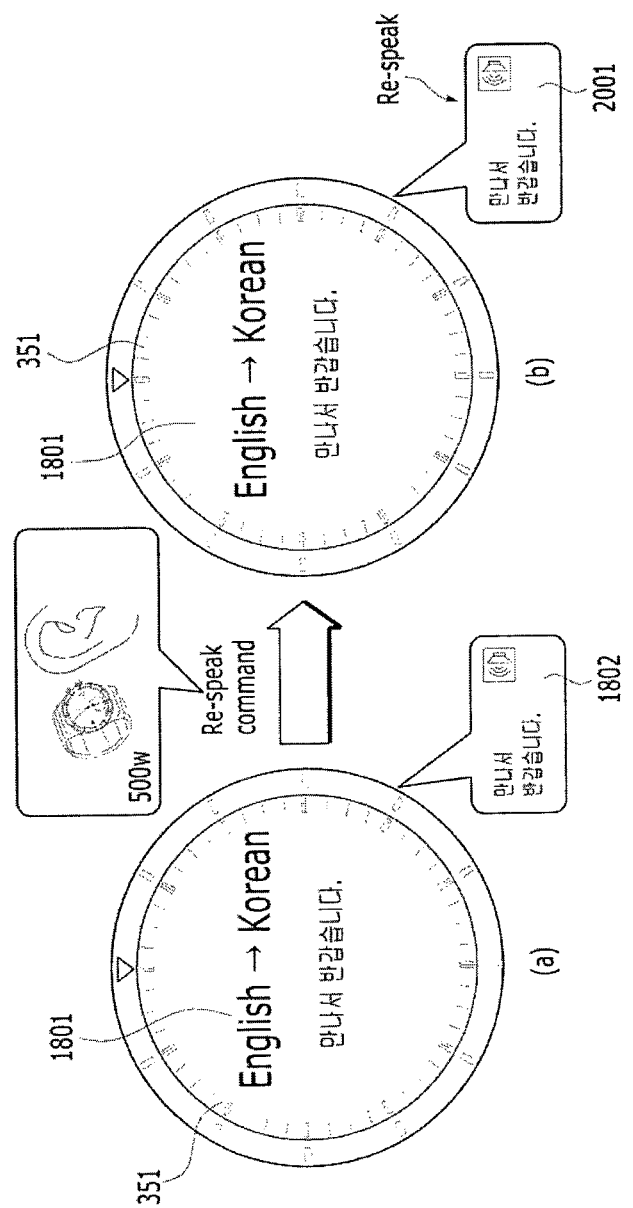
FIG. 20 shows diagrams for a control method of re-outputting an audio output of a translated content according to one embodiment of the present invention.

FIG. 20 is a diagram for a control method of re-outputting an audio output of a translated content according to one embodiment of the present invention.

Referring to FIG. 20 (a), the controller 180 translates a voice input received in a second language into a first language and provides a display 1801 of a translated content on the touchscreen 351. And, the controller 180 provides an audio output 1802 of the translated content through the audio output unit 152 as well. When a user desires to listen to the audio output 1802 again, according to one embodiment of the present invention, it is able to use a re-speak gesture.

Referring to FIG. 20 (b), if the re-speak gesture 500w is received, the controller 180 can provide a re-output 2001 of the outputted audio output 1802.

According to one embodiment of the present invention, as the re-speak gesture 500w, a gesture of brining the mobile terminal 300 to an ear is proposed [cf. the drawing shown in FIG. 20].

Meanwhile, according to another embodiment of the present invention, in case that a translation is not performed smoothly due to misrecognition or the like, a control method of making a request for a voice input to a counterpart again is further proposed. Such an embodiment is described in detail with reference to FIG. 21 as follows.

Figure 21:
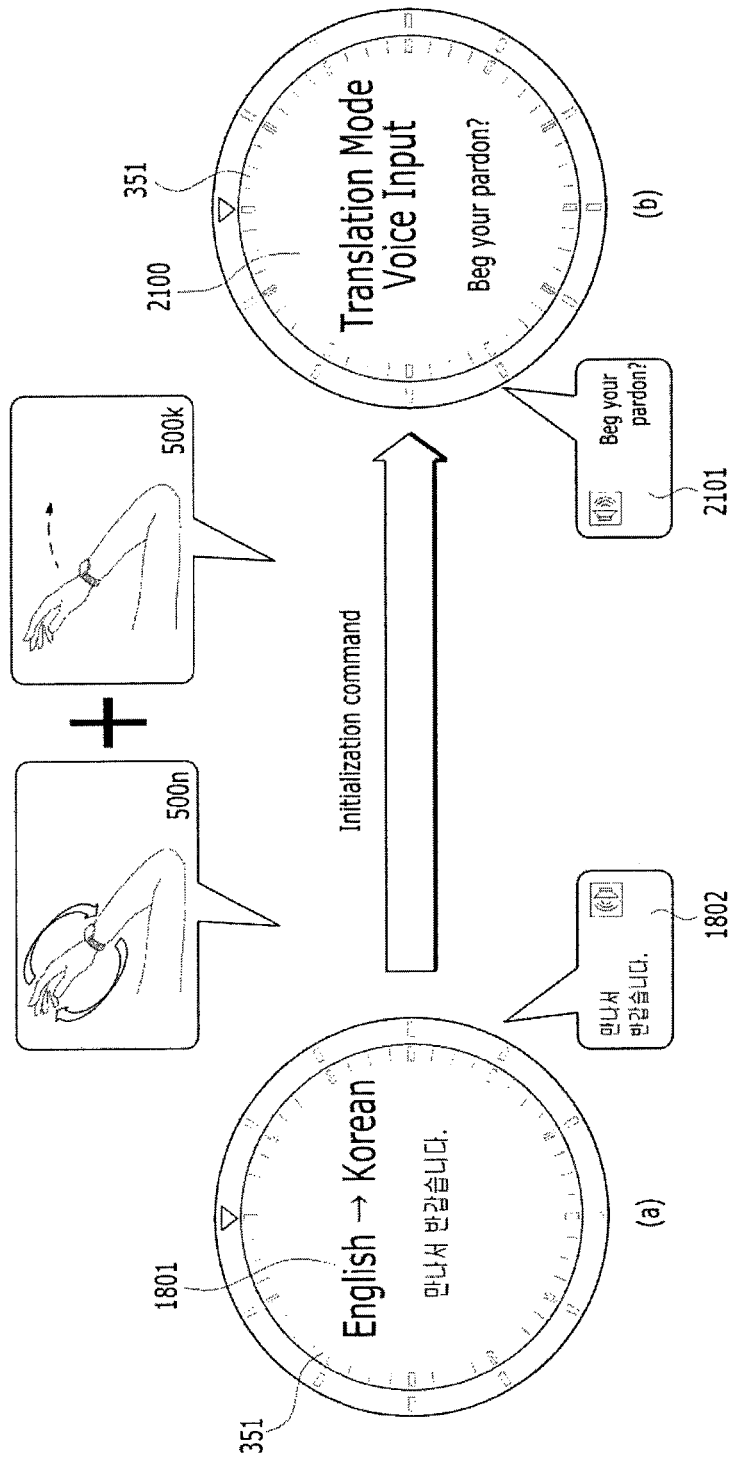
FIG. 21 shows diagrams for a control method of re-requesting a voice input if failing to receive the voice input correctly according to one embodiment of the present invention.

FIG. 21 is a diagram for a control method of re-requesting a voice input if failing to receive the voice input correctly according to one embodiment of the present invention.

Referring to FIG. 21 (a), the controller 180 translates a voice input received in a second language into a first language and provides a display 1801 of a translated content on the touchscreen 351. And, the controller 180 provides an audio output 1802 of the translated content through the audio output unit 152 as well. If an initialize gesture is received, referring to FIG. 21 (b), the controller 180 can provide outputs 2100 and 2101 of a request for requesting to perform a voice input again through the touchscreen 351 and the audio output unit 152, respectively.

According to one embodiment of the present invention, a gesture of sequentially performing the aforementioned gesture 500 of rotating a wrist clockwise and counterclockwise and the aforementioned first language switch gesture 500k is proposed as the initialize gesture.

Meanwhile, in case that various language settings exist, a control method of switching among the various language settings is required. Such a control method is described in detail with reference to FIG. 22 as follows.

Figure 22:
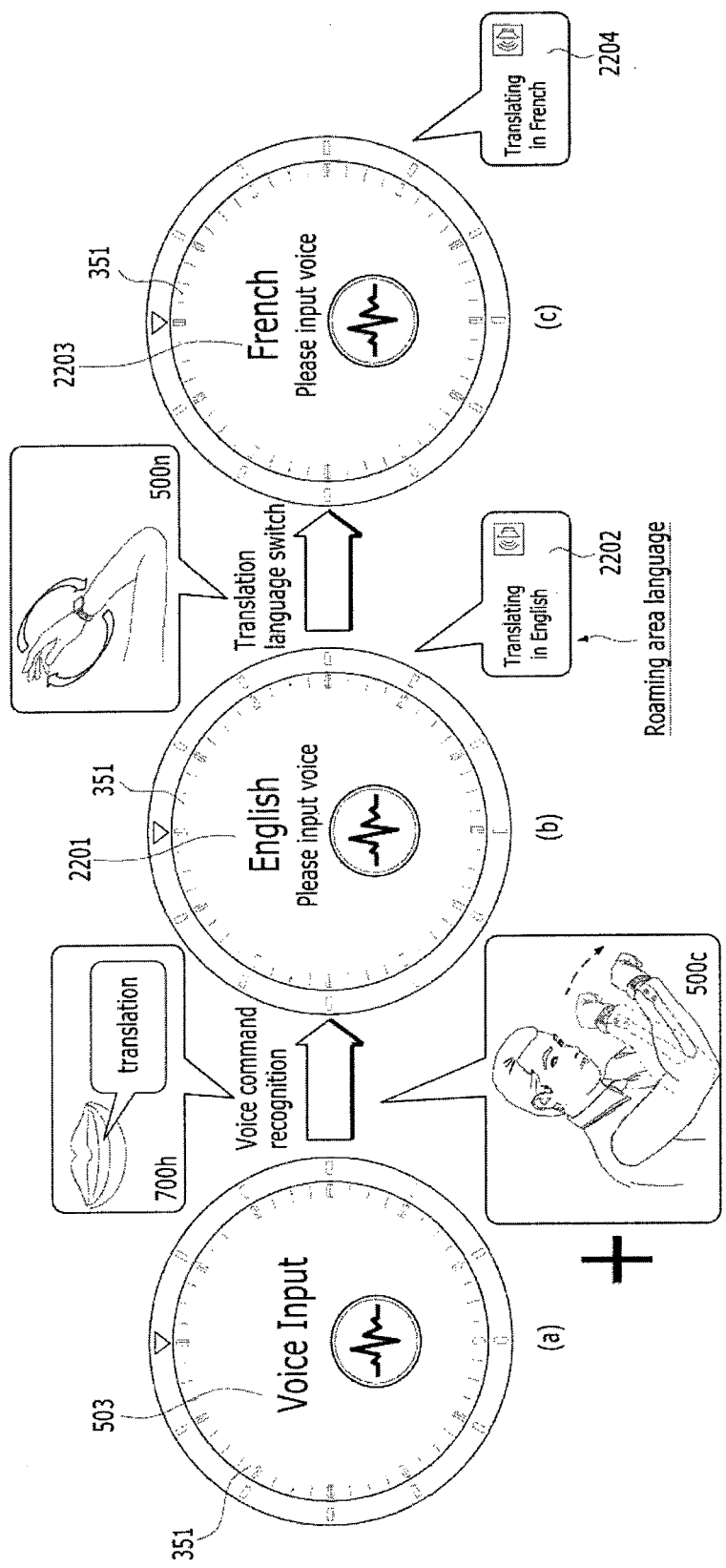
FIG. 22 shows diagrams for a control method of automatically setting languages by detecting a country, at which a mobile terminal 300 is currently located, and then switching the set languages to each other according to one embodiment of the present invention.

FIG. 22 is a diagram for a control method of automatically setting languages by detecting a country, at which the mobile terminal 300 is currently located, and then switching the set languages to each other according to one embodiment of the present invention.

Referring to FIG. 22 (a), the mobile terminal 300 enters a voice recognition mode and is able to output a voice command guide screen 503. The controller 180 enters a translation mode for translation into a prescribed language based on a recognized voice input 700h and is able to output a translation mode screen 2201 for the translation into the prescribed language through the touchscreen 351. And, the controller 180 can output a translation guide mention 2202 for the translation into the prescribed language through the audio output unit 152.

According to one embodiment of the present invention, a country at which the mobile terminal 300 is currently located and a translation setting can be set for a language of the detected country. In particular, the prescribed language may include a language used in an area at which the mobile terminal 300 is currently located. Meanwhile, since a plurality of languages can be used in a specific country, a control method of switching among a plurality of the languages is required as well.

Therefore, according to one embodiment of the present invention, if a mode switch gesture is received in a mode for translation into a first language, it is proposed to switch to a mode for translation into a second language. In this case, each of the first and second languages may include the language determined on the basis of a location of the mobile terminal 300.

According to one embodiment of the present invention, a gesture 500n of rotating a wrist clockwise and counterclockwise is proposed as the mode switch gesture.

If the gesture 500n of rotating a wrist clockwise and counterclockwise is detected, the controller 180 switches to a translation mode for translation into the second language and is able to output a translation mode screen 2203 for the translation into the second language. And, the controller 180 can output a translation guide mention 2204 for the translation into the second language.

Meanwhile, the above-described translation control method is applicable not only to the mobile terminal 300 of the watch type but also to the mobile terminal 100 of the general type. Such an embodiment is described in detail with reference to FIG. 23 as follows.

Figure 23:
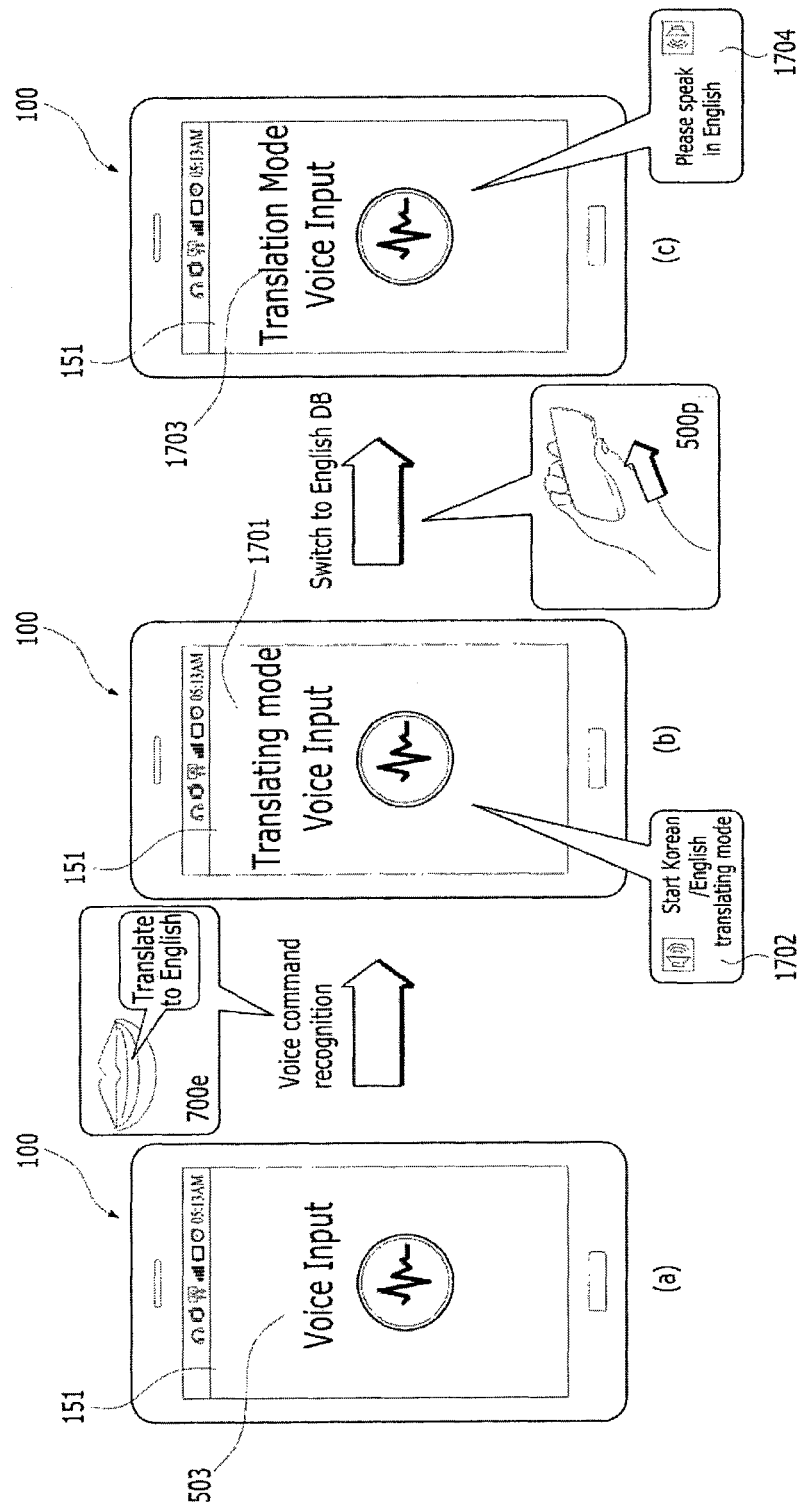
FIG. 23 shows diagrams for one example of applying a translation control method to a mobile terminal 100 of a general type according to one embodiment of the present invention.

FIG. 23 is a diagram for one example of applying a translation control method to a mobile terminal 100 of a general type according to one embodiment of the present invention.

Referring to FIG. 23 (a), the mobile terminal 100 enters a voice recognition mode and is able to output a voice command guide screen 503.

The controller 180 enters an English translation mode based on a recognized voice input 700e and is able to output a translation mode screen 1701 through the touchscreen 351. And, the controller 180 can output a translation guide mention 1702 through the audio output unit 152.

According to the example shown in FIG. 23, FIG. 23 (a) and FIG. 23 (b) show that a voice recognition is set for Korean. If a first language switch gesture 500p is received, the controller 180 can switch the language setting of the voice recognition to a second language (e.g., English in FIG. 23) from a first language (e.g., Korean in FIG. 23). The controller 180 outputs a translation mode screen 1703 in the second language, which is switched from the former translation mode screen 1701. And, the controller 180 can output a translation guide mention 1704 in the second language, which is switched from the former translation guide mention 1702.

According to one embodiment of the present invention, the first language switch gesture 500*p* may include a gesture performed in a manner that a user of the mobile terminal proffers the mobile terminal 100 worn by the corresponding user to another person. In particular, the first language switch gesture 500*p* includes a gesture for requesting a voice recognition in the second language by holding out an arm having the mobile terminal 100 worn thereon to another person.

According to the above-description of the control method, a translation operation is performed by applying a gesture and a voice command to the mobile terminal 300. In the following description, additional functions according to the embodiments of the present invention are described in detail.

Figure 24:
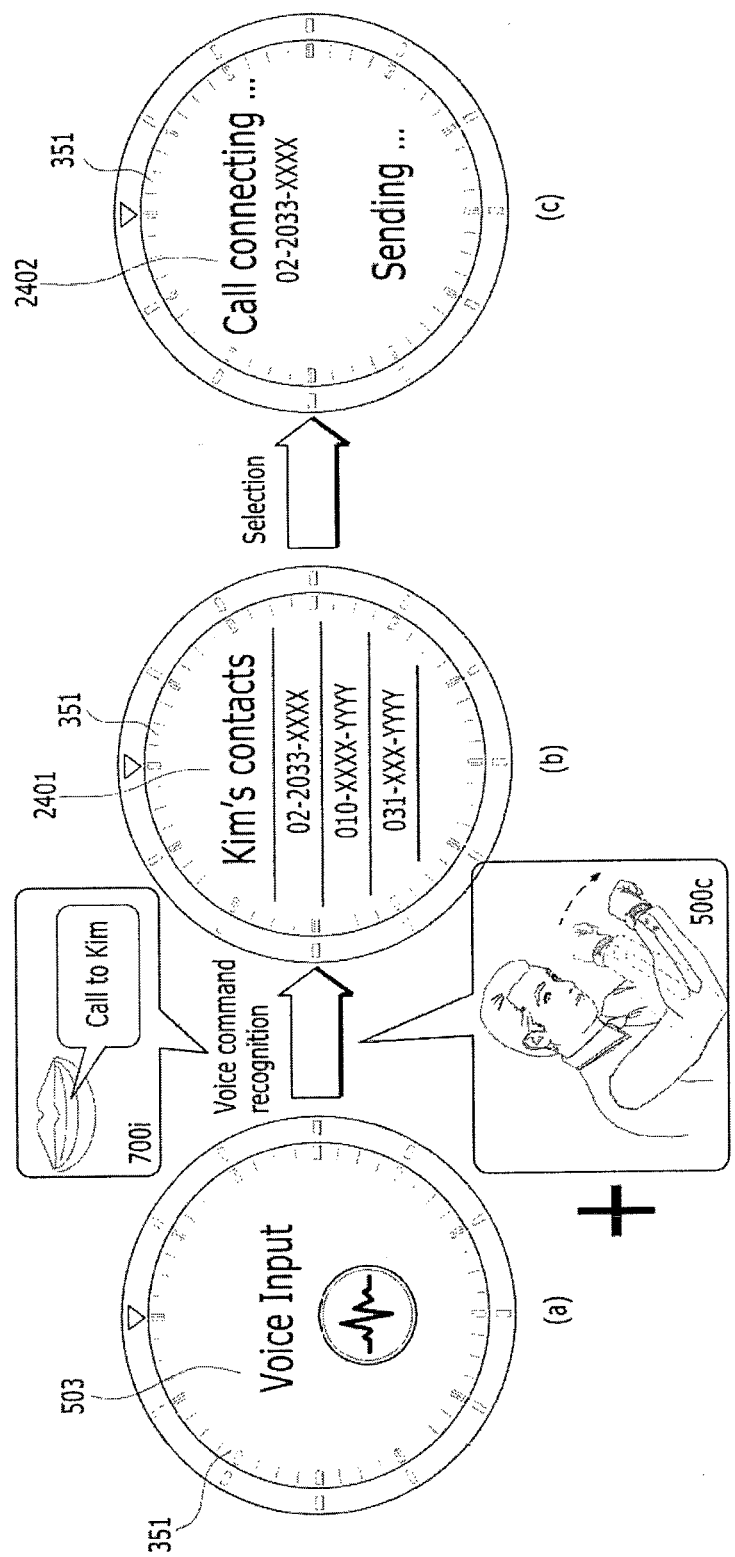
FIG. 24 shows diagrams for a control method of making a phone call easily using a voice command according to one embodiment of the present invention.

FIG. 24 is a diagram for a control method of making a phone call easily using a voice command according to one embodiment of the present invention.

Referring to FIG. 24 (*a*), the mobile terminal 300 outputs a voice input screen 503, which indicates a state that a voice can be received from a user, through the touchscreen 351.

If a voice input 'Call to Kim' 700*i* is received and a voice command reception end gesture 500*c* is detected, the controller 180 searches contacts saved in a contact database for a contact corresponding to a name 'Kim' and then outputs a search result as a list 2401 [FIG. 24 (*b*)]. In this case, the found contact may include a plurality of contacts saved for the name 'Kim' or a plurality of contacts for different persons of the same name.

If a prescribed item is selected from the outputted list 2401, the controller 180 can control a call signal to be transmitted to the contact corresponding to the selected item [2402].

Figure 25:
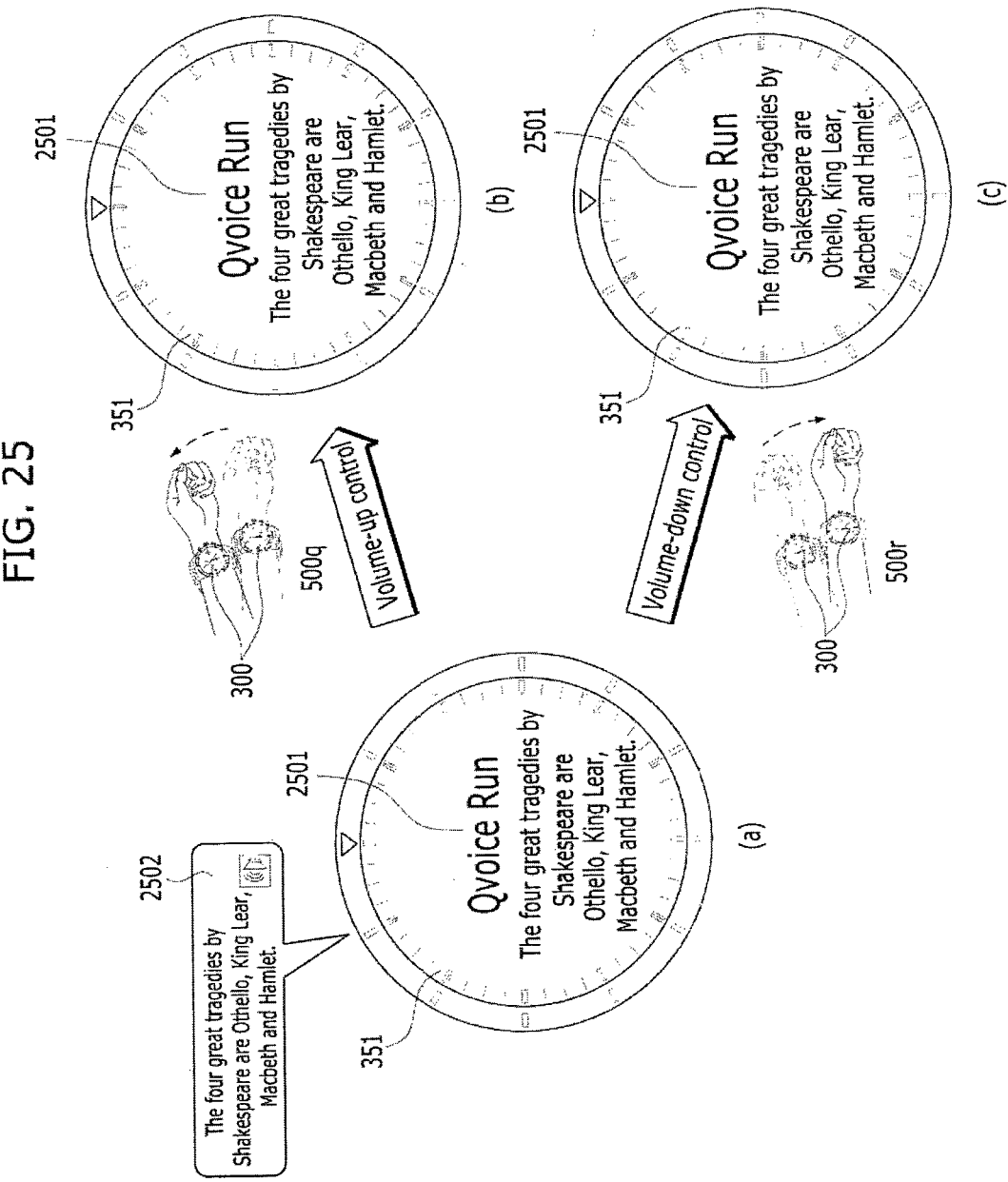
FIG. 25 shows diagrams for a control method of adjusting a volume of an audio output unit 152 easily according to one embodiment of the present invention.

FIG. 25 is a diagram for a control method of adjusting a volume of an audio output unit 152 easily according to one embodiment of the present invention.

Referring to FIG. 25 (*a*), a prescribed information 2501 is outputted through the touchscreen 351 in response to a voice input applied by a user. And, an audio output 2502 of the prescribed information is provided through the audio output unit 152.

If a volume for the audio output 2502 is not appropriate, the user may control the volume of the audio output 2502 using a volume control gesture.

Referring to FIG. 25 (*b*), if an upward control gesture 500*q* is received, the controller 180 can control the volume of the audio output 2502 to be raised. Referring to FIG. 25 (*c*), if a downward control gesture 500*r* is received, the controller 180 can control the volume of the audio output 2502 to be raised.

According to one embodiment of the present invention, a gesture of bending up a wrist by making a fist is proposed as the upward control gesture 500*q*. According to one embodiment of the present invention, a gesture of bending down a wrist by making a fist is proposed as the downward control gesture 500*r*.

Meanwhile, according to one embodiment of the present invention, further proposed is a control method for controlling a microphone gain. Such an embodiment is described in detail with reference to FIG. 26 as follows.

Figure 26:
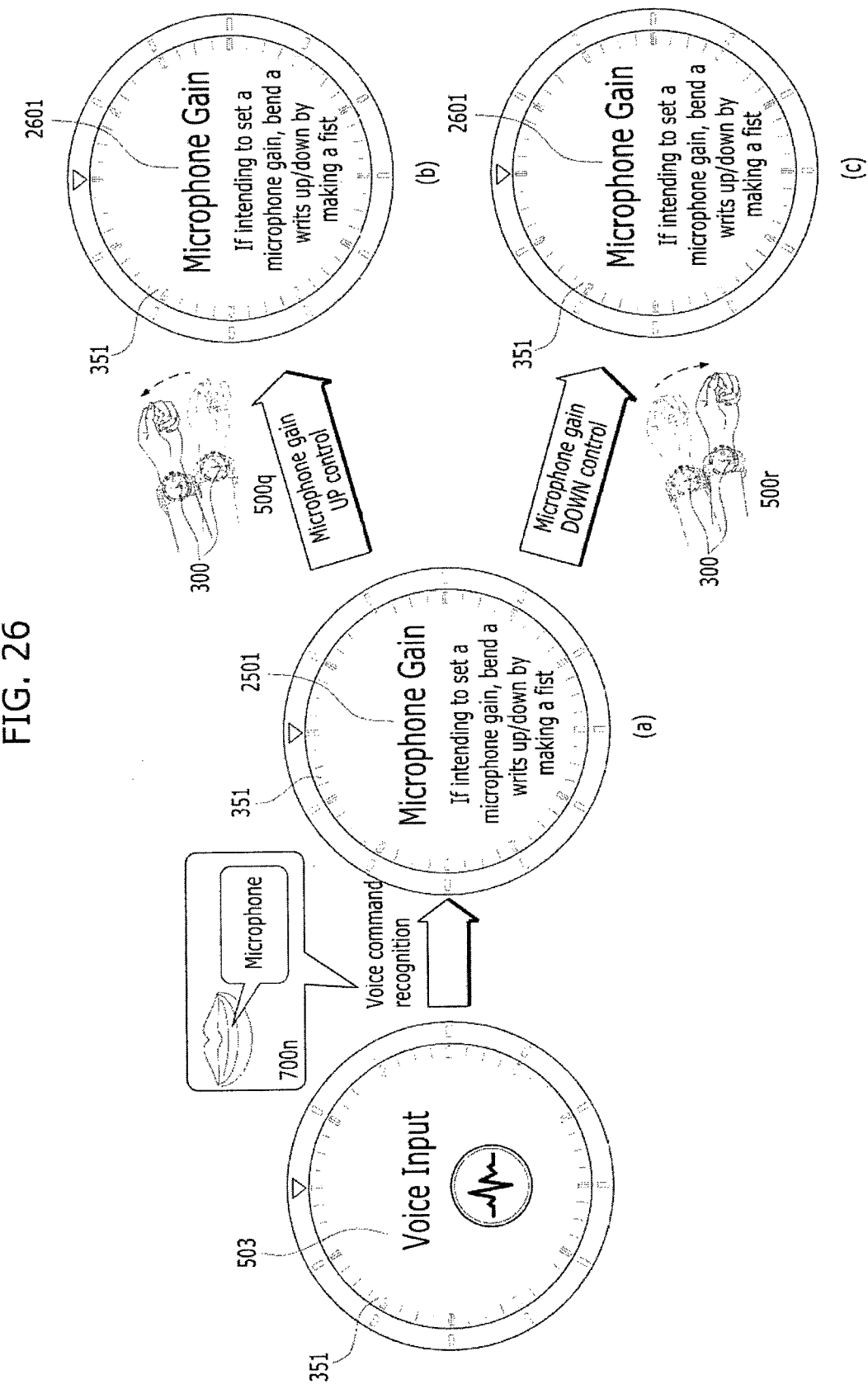
FIG. 26 shows diagrams for a control method of controlling a microphone gain according to one embodiment of the present invention.

FIG. 26 is a diagram for a control method of controlling a microphone gain according to one embodiment of the present invention.

Referring to FIG. 26 (*a*), the mobile terminal 300 outputs a voice input screen 503, which indicates a state that a voice can be received from a user, through the touchscreen 351.

If a microphone activation voice input 700*n* is received, the controller 180 enters a microphone gain control mode and is able to output a control guide screen 2601. Referring to FIG. 26 (*b*), if an upward control gesture 500*q* is received, the controller 180 can control a microphone gain to be raised. Referring to FIG. 26 (*c*), if a downward control gesture 500*r* is received, the controller 180 can control a microphone gain to be lowered.

Figure 27:
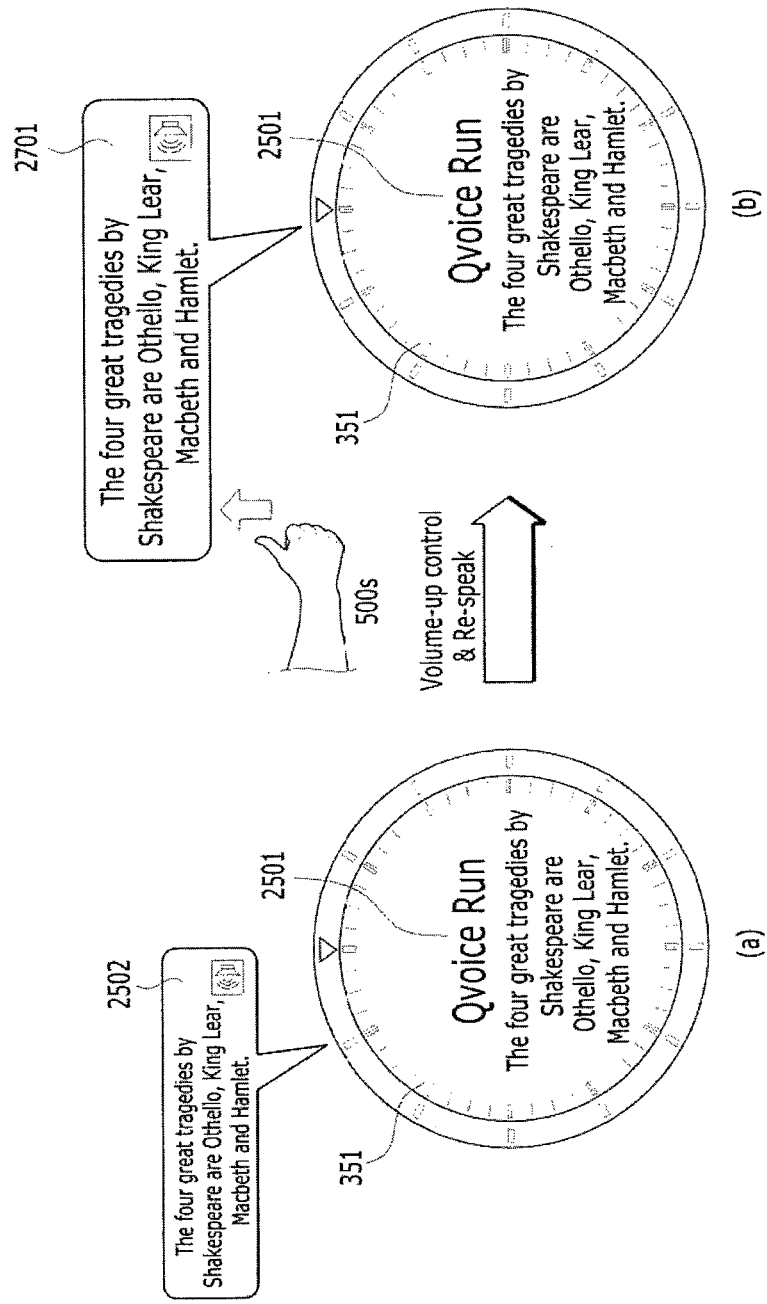
FIG. 27 shows diagrams for a control method of raising a volume of an audio output for a prescribed function and then outputting the volume raised audio output according to one embodiment of the present invention.

FIG. 27 is a diagram for a control method of raising a volume of an audio output for a prescribed function and then outputting the volume raised audio output according to one embodiment of the present invention.

Referring to FIG. 27 (*a*), the controller 180 outputs a prescribed information 2501 through the touchscreen 351 in response to a voice input applied by a user. And, an audio output 2502 of the prescribed information is provided through the audio output unit 152.

According to one embodiment of the present invention, if the user desires to listen to the audio output 2502 again, it is able to use a re-speak gesture.

If the re-speak gesture 500*s* is received, referring to FIG. 27 (*b*), the controller 180 adjusts a volume and is then able to re-output the outputted audio output 2502.

According to one embodiment of the present invention, a gesture of thumbing up by making a fist is proposed as the re-speak gesture 500*s*.

Accordingly, the present invention provides the following effect and/or feature.

First of all, the present invention provides a mobile terminal and controlling method thereof, by which user's convenience is enhanced.

Secondly, according to at least one of embodiments of the present invention, it is advantageous in that primary functions of a mobile terminal can be controlled using a simple gesture and/or a voice command only.

It will be appreciated by those skilled in the art that the present invention can be specified into other form(s) without departing from the spirit or scope of the inventions.

In addition, the above-described methods can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet).

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Accordingly, embodiments of the present invention are directed to a mobile terminal and controlling method thereof that substantially obviate one or more problems due to limitations and disadvantages of the related art.

The present invention is devised for the aforementioned necessity, and an object of the present invention is to provide a mobile terminal and controlling method thereof, by which user's convenience is enhanced.

In particular, one object of the present invention is to provide a mobile terminal and controlling method thereof, by which a primary function of the mobile terminal can be controlled using a simple gesture and/or a voice command.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal of a watch type according to one embodiment of the present invention may include a display unit, a microphone, a sensing unit configured to detect a gesture, and a controller configured to convert voice data, received based on the microphone, to a text in a first language, detect, using the sensing unit, a first gesture, and in response to detecting the first gesture, translate the text in the first language to text in a second language.

In another aspect of the present invention, as embodied and broadly described herein, a method of controlling a mobile terminal of a watch type according to another embodiment of the present invention may include receiving voice data at a microphone, converting the voice data into a text in a first language, detecting a first gesture, and in response to detecting the first gesture, translating the text in the first language into text in a second language.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal of a watch type, comprising:
   a display unit;
   a microphone;
   a sensing unit configured to detect a gesture; and
   a controller configured to:
   convert voice data, received based on the microphone, to a text in a first language,
   when a first gesture is not detected, translate the text in the first language to text in a second language, and
   when the first gesture is detected, translate the text in the second language to text in the first language.

2. The mobile terminal of claim 1,
   wherein the first gesture is a gesture of changing an exposed surface, on which the microphone or display unit is provided, to another person, or is a gesture of moving of the mobile terminal in a prescribed direction.

3. The mobile terminal of claim 1, wherein in direct response to detecting the first gesture, the controller is configured to start translating the text in the first language into the text in the second language.

4. The mobile terminal of claim 3, wherein in response to detecting a second gesture, the controller is configured to stop translating the text in the first language into the text of the second language.

5. The mobile terminal of claim 4, wherein the second gesture is a gesture for changing an exposed surface on which the microphone is provided.

6. The mobile terminal of claim 1, wherein the controller is configured to start converting the voice data into the text when a second gesture and a third gesture are consecutively detected, the second gesture is a moving of the mobile terminal in a first direction, and the third gesture is moving the mobile terminal in a second direction which is different from the first direction.

7. The mobile terminal of claim 1, further comprising an audio output unit, wherein the controller is configured to control the audio output unit to output audio based on the text in the first language or in the second language.

8. The mobile terminal of claim 7, wherein in response to detecting a second gesture, the controller is configured to control the audio output unit to again output the audio.

9. The mobile terminal of claim 1, wherein in response to detecting a second gesture, the controller is configured to stop converting the voice data into the text.

10. The mobile terminal of claim 9, wherein the first gesture is a gesture of moving the mobile terminal in a first direction, and the second gesture is a gesture of moving the mobile terminal in a second direction which is different from the first direction.

11. A method of controlling a watch type mobile terminal comprising:
    receiving voice data at a microphone;
    converting the voice data into a text in a first language;
    when a first gesture is not detected, translating the text in the first language into text in a second language, and
    when the first gesture is detected, translating the text in the second language to text in the first language.

12. The method of claim 11, wherein the first gesture is a gesture of changing an exposed surface on which the microphone or a display unit is provided, or is a gesture of moving the mobile terminal in a prescribed direction.

13. The method of claim 11, wherein translating the text includes starting to translate the text in direct response to the detecting of the first gesture.

14. The method of claim 13, further comprising:
   detecting a second gesture; and
   in response to detecting the second gesture, stopping the translating of the text in the first language into text in the second language.

15. The method of claim 14, wherein the second gesture is a gesture for changing an exposed surface on which the microphone is provided.

16. The method of claim 11, wherein converting the voice data into the text includes starting the converting when a second gesture and a third gesture are consecutively detected, the second gesture is a moving of the mobile terminal in a first direction, and the third gesture is a moving of the mobile terminal in a second direction which is different from the first direction.

17. The method of claim 11, further comprising outputting audio, via an audio output unit, based on the text in the first language or the text in the second language.

18. The method of claim 17, further comprising:
   detecting a second gesture, and
   in response to detecting the second gesture, outputting the audio data again via the audio output unit.

19. The method of claim 11, further comprising:
   detecting a second gesture; and
   in response to detecting the second gesture, stopping the converting of the voice data into the text.

20. The method of claim 19, wherein the first gesture is a gesture of moving the mobile terminal in a first direction, and the second gesture is a gesture of moving the mobile terminal in a second direction which is different from the first direction.

* * * * *